United States Patent
Grimes et al.

(10) Patent No.: US 9,280,581 B1
(45) Date of Patent: Mar. 8, 2016

(54) METHOD AND SYSTEM FOR DETERMINATION OF DATA COMPLETENESS FOR ANALYTIC DATA CALCULATIONS

(71) Applicant: Troux Technologies, Inc., Austin, TX (US)

(72) Inventors: Mikal Grimes, Austin, TX (US); David K. Williams, Austin, TX (US); James Balling, Jr., Austin, TX (US)

(73) Assignee: Troux Technologies, Inc., Austin, TX (US)

( * ) Notice: Subject to any disclaimer, the term of this patent is extended or adjusted under 35 U.S.C. 154(b) by 149 days.

(21) Appl. No.: 13/796,132

(22) Filed: Mar. 12, 2013

(51) Int. Cl.
*G06F 7/02* (2006.01)
*G06F 17/30* (2006.01)
*G06F 17/18* (2006.01)

(52) U.S. Cl.
CPC .......... *G06F 17/30424* (2013.01); *G06F 17/18* (2013.01); *G06F 17/30294* (2013.01)

(58) Field of Classification Search
CPC .............. G06F 17/30294; G06F 17/18; G06F 17/30587
See application file for complete search history.

(56) References Cited

U.S. PATENT DOCUMENTS

| | | |
|---|---|---|
| 5,572,732 A | 11/1996 | Fant |
| 5,845,068 A | 12/1998 | Winiger |
| 5,968,176 A | 10/1999 | Nessett et al. |
| 6,226,792 B1 | 5/2001 | Goiffon |
| 6,292,900 B1 | 9/2001 | Ngo et al. |
| 6,442,557 B1 | 8/2002 | Buteau |
| 6,509,898 B2 | 1/2003 | Chi |
| 6,529,909 B1 | 3/2003 | Bowman-Amuah |
| 6,611,838 B1 | 8/2003 | Ignat |
| 6,662,188 B1 | 12/2003 | Rasmussen |
| 7,080,077 B2 | 7/2006 | Ramamurthy et al. |
| 7,103,171 B1 | 9/2006 | Annadata |
| 7,124,180 B1 | 10/2006 | Ranous |
| 7,231,661 B1 | 6/2007 | Villavicencio et al. |
| 7,409,707 B2 | 8/2008 | Swander et al. |
| 7,428,546 B2 | 9/2008 | Nori |
| 7,480,798 B2 | 1/2009 | Haugh |
| 7,512,965 B1 | 3/2009 | Amdur et al. |
| 7,523,128 B1 | 4/2009 | Miller et al. |
| 7,533,173 B2 | 5/2009 | Badovinatz et al. |
| 7,558,790 B1 | 7/2009 | Miller et al. |
| 7,603,547 B2 | 10/2009 | Patrick et al. |
| 7,644,432 B2 | 1/2010 | Patrick et al. |
| 7,664,712 B1 | 2/2010 | Duvall et al. |

(Continued)

OTHER PUBLICATIONS

Office Action for U.S. Appl. No. 10/803,133, mailed Oct. 4, 2006, 9 pgs.
Office Action for U.S. Appl. No. 10/803,133, mailed May 17, 2007, 11 pgs.
Office Action for U.S. Appl. No. 10/802,304, mailed Jun. 18, 2007, 9 pgs.
Muller, Robert, "Database Design for Smarties Using UML for Data Modeling," Morgan Kaufmann Publishers, 1999, 265 pgs.
Office Action for U.S. Appl. No. 11/095,323, mailed Aug. 10, 2007, 12 pgs.

(Continued)

*Primary Examiner* — Bruce Moser
(74) *Attorney, Agent, or Firm* — Sprinkle IP Law Group

(57) ABSTRACT

A system, method and computer program product capable of determining data completeness associated with an analysis based on a data model at the same time that the data in the data model is being analyzed. A root node may be determined, and all paths from the root node discovered. Each path is decomposed into steps, and a ratio is calculated for each step. The ratios may be multiplied for each path, and the aggregate of the paths may determine a measure of the data completeness corresponding to the analysis and return the results of the analysis and the measure of data completeness at the same time.

20 Claims, 19 Drawing Sheets

(56) References Cited

U.S. PATENT DOCUMENTS

| | | | |
|---|---|---|---|
| 7,669,051 | B2 | 2/2010 | Redlich et al. |
| 7,698,683 | B1 | 4/2010 | Miller et al. |
| 7,757,277 | B2 | 7/2010 | Haugh |
| 7,822,710 | B1 | 10/2010 | Miller et al. |
| 7,890,545 | B1 | 2/2011 | Cason, Jr. et al. |
| 8,027,956 | B1 | 9/2011 | Van Riper et al. |
| 8,086,615 | B2 | 12/2011 | Patrick et al. |
| 8,214,877 | B1 | 7/2012 | Grimes et al. |
| 8,234,223 | B1 | 7/2012 | Maginniss |
| 8,386,377 | B1 * | 2/2013 | Xiong et al. ............... 705/38 |
| 8,635,592 | B1 | 1/2014 | Bodman et al. |
| 8,789,011 | B2 | 7/2014 | Miller et al. |
| 2003/0009487 | A1 | 1/2003 | Prabakaran et al. |
| 2003/0088551 | A1 | 5/2003 | Tong |
| 2003/0110253 | A1 | 6/2003 | Anuszczyk |
| 2003/0177481 | A1 | 9/2003 | Amaru |
| 2003/0187826 | A1 | 10/2003 | Kennedy et al. |
| 2003/0208367 | A1 | 11/2003 | Aizenbud-Reshef |
| 2003/0212640 | A1 | 11/2003 | Andresen |
| 2004/0002818 | A1 | 1/2004 | Kulp |
| 2004/0049509 | A1 | 3/2004 | Keller |
| 2004/0059943 | A1 | 3/2004 | Marquet et al. |
| 2004/0073655 | A1 | 4/2004 | Kan |
| 2004/0111513 | A1 | 6/2004 | Shen |
| 2004/0225791 | A1 | 11/2004 | Keskar |
| 2004/0243835 | A1 | 12/2004 | Terzis et al. |
| 2004/0260706 | A1 | 12/2004 | Anonsen et al. |
| 2005/0033762 | A1 | 2/2005 | Kasravi |
| 2005/0138039 | A1 | 6/2005 | Hagen |
| 2005/0203920 | A1 | 9/2005 | Deng |
| 2006/0085837 | A1 | 4/2006 | Pesati et al. |
| 2006/0106796 | A1 | 5/2006 | Venkataraman |
| 2006/0136437 | A1 | 6/2006 | Yamasaki |
| 2006/0167927 | A1 | 7/2006 | Edelstein |
| 2006/0195460 | A1 | 8/2006 | Nori |
| 2006/0195575 | A1 | 8/2006 | Delany et al. |
| 2006/0212487 | A1 | 9/2006 | Kennis et al. |
| 2006/0253709 | A1 | 11/2006 | Cheng et al. |
| 2006/0277022 | A1 | 12/2006 | Pulfer |
| 2006/0294148 | A1 | 12/2006 | Brunet |
| 2007/0143604 | A1 | 6/2007 | Arroyo et al. |
| 2007/0180490 | A1 | 8/2007 | Renzi et al. |
| 2007/0192415 | A1 | 8/2007 | Pak |
| 2007/0255841 | A1 | 11/2007 | Chong |
| 2007/0282916 | A1 | 12/2007 | Albahari et al. |
| 2008/0120362 | A1 | 5/2008 | Kapoor et al. |
| 2010/0169380 | A1 | 7/2010 | Miller et al. |
| 2013/0144796 | A1 * | 6/2013 | Fout et al. ............... 705/306 |

OTHER PUBLICATIONS

Office Action for U.S. Appl. No. 10/802,178 mailed Sep. 5, 2007, 11 pgs.

Office Action for U.S. Appl. No. 10/803,133 mailed Nov. 2, 2007, 10 pgs.

Office Action for U.S. Appl. No. 10/802,304, mailed Jan. 9, 2008, 11 pgs.

Office Action for U.S. Appl. No. 10/802,178 mailed Mar. 3, 2008, 10 pgs.

Office Action for U.S. Appl. No. 11/095,323, mailed Mar. 3, 2008, 16 pgs.

Office Action for U.S. Appl. No. 11/198,649, mailed Apr. 29, 2008, 10 pgs.

Office Action for U.S. Appl. No. 10/803,133 mailed May 28, 2008, 12 pgs.

Office Action for U.S. Appl. No. 10/802,304, mailed Jun. 30, 2008, 14 pgs.

Office Action for U.S. Appl. No. 10/802,178 mailed Aug. 19, 2008, 9 pgs.

Office Action for U.S. Appl. No. 11/095,323, mailed Aug. 20, 2008, 13 pgs.

Office Action for U.S. Appl. No. 11/117,039, mailed Aug. 20, 2008, 19 pgs.

Office Action for U.S. Appl. No. 10/803,133, mailed Oct. 7, 2008, 14 pgs.

Office Action for U.S. Appl. No. 11/117,039, mailed Feb. 12, 2009, 27 pgs.

Office Action for U.S. Appl. No. 10/802,304, mailed Feb. 17, 2009, 12 pgs.

Office Action for U.S. Appl. No. 11/095,323, mailed Feb. 17, 2009, 14 pgs.

Office Action for U.S. Appl. No. 11/198,649, mailed Feb. 27, 2009, 11 pgs.

Office Action for U.S. Appl. No. 10/802,304, mailed Aug. 4, 2009, 9 pgs.

Gornik, D., "UML Data Modeling Profile," May 2002, Rational Software Corp., TP162, pp. i-ii, 1-11.

Cbop et al., "A UML Profile for Enterprise Distributed Object Computing—Joint Final Submission—Component Collaboration Architecture (CCA)," 169 pgs., OMG Document No. ad/Aug. 19, 2001, 2001, at http://enterprisecomponent.com/docs/EdocCCA.pdf.

Office Action for U.S. Appl. No. 11/117,039, mailed Aug. 17, 2009, 26 pgs.

Office Action for U.S. Appl. No. 11/095,323, mailed Aug. 28, 2009, 15 pgs.

Office Action for U.S. Appl. No. 11/805,873, mailed Sep. 11, 2009, 9 pgs.

Office Action for U.S. Appl. No. 11/095,323, mailed Mar. 1, 2010, 21 pgs.

Office Action for U.S. Appl. No. 11/117,039, mailed Mar. 15, 2010, 28 pgs.

Office Action for U.S. Appl. No. 11/805,873, mailed Mar. 15, 2010, 10 pgs.

Office Action for U.S. Appl. No. 11/929,157, mailed Jun. 6, 2010, 13 pgs.

Du, W. et al., "XML Structures for Relational Data," Web Information Systems Engineering, 2001, Proceedings of the Second Int'l Conf. on (0-7965-1393-X), Dec. 3-6, 2001, vol. 1, pp. 151-160, at http://ieeexplore.ieee.org/stamp/stamp.jsp?isnumber+21506&arnumber=996476&punumber=7824.

Notice of Allowance for U.S. Appl. No. 11/805,873, mailed Aug. 31, 2010, 6 pgs.

Office Action for U.S. Appl. No. 11/929,157, mailed Nov. 24, 2010, 12 pgs.

Office Action for U.S. Appl. No. 11/805,002, mailed Feb. 2, 2011, 12 pgs.

Notice of Allowance for U.S. Appl. No. 11/929,157, mailed May 23, 2011, 17 pgs.

Office Action for U.S. Appl. No. 11/805,002, mailed Jul. 20, 2011, 18 pgs.

Notice of Allowance for U.S. Appl. No. 11/805,002, mailed Mar. 2, 2012, 16 pgs.

Notice of Allowance for U.S. Appl. No. 11/117,039, mailed Mar. 27, 2012, 15 pgs.

Maloney, David, "E-manufacturing e'zing into factories: the potential is great for using the Internet to aid Manufacturing. Supply chain visibility, the wired plant, trading exchanges and data sharing are at the forefront," Modern Material Handling, vol. 57, n6, p. 21 (3), May 15, 2002.

Office Action for U.S. Appl. No. 12/720,219, mailed Aug. 14, 2012, 9 pgs.

Office Action for U.S. Appl. No. 13/022,778, mailed Feb. 15, 2013, 8 pgs.

Notice of Allowance for U.S. Appl. No. 13/022,778, mailed Sep. 12, 2013, 5 pgs.

Notice of Allowance issued for U.S. Appl. No. 12/720,219, mailed Dec. 31, 2013, 6 pages.

* cited by examiner

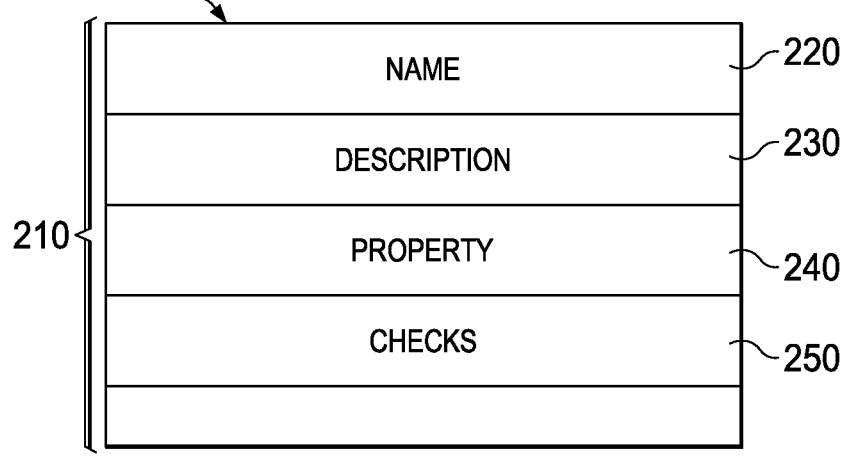
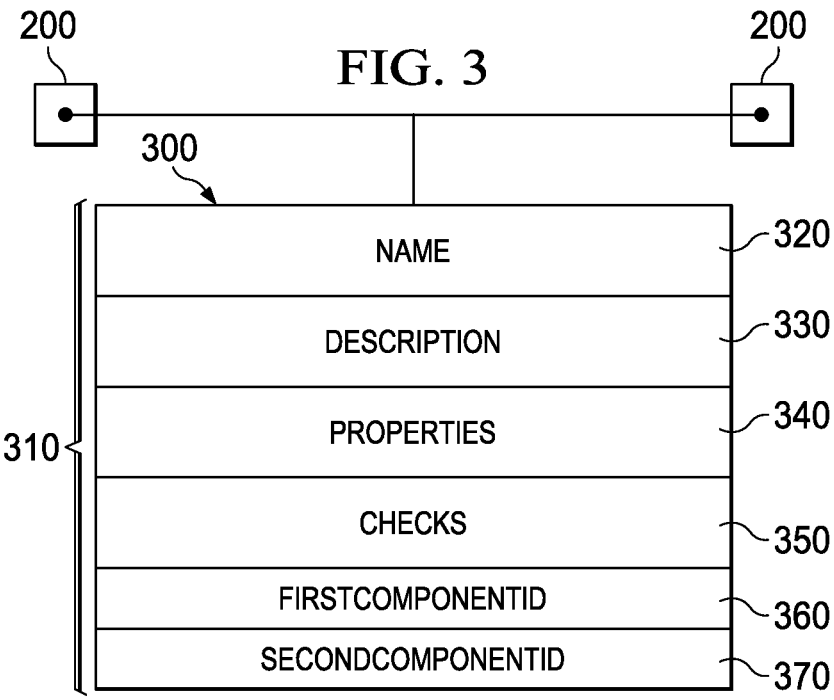

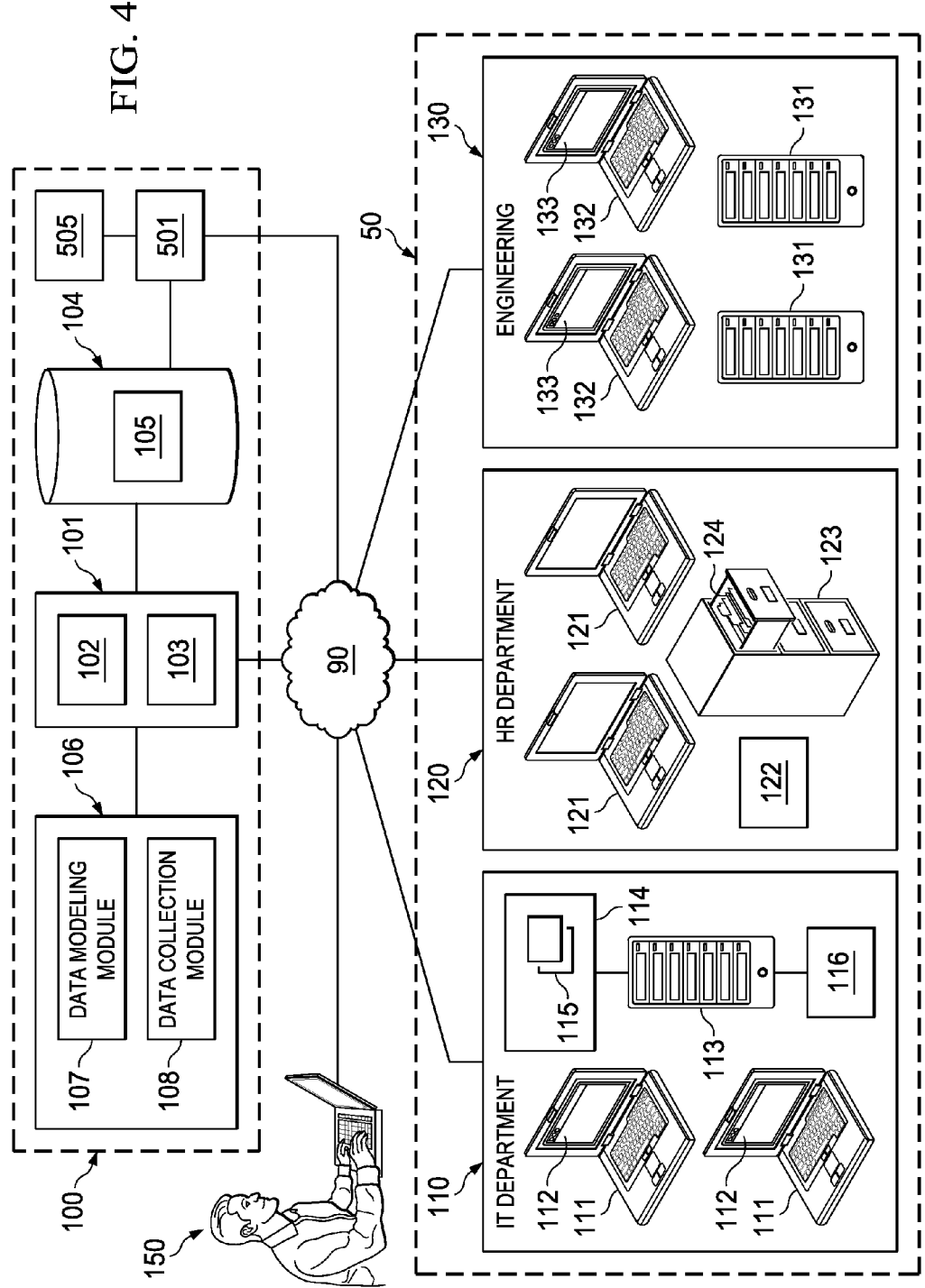

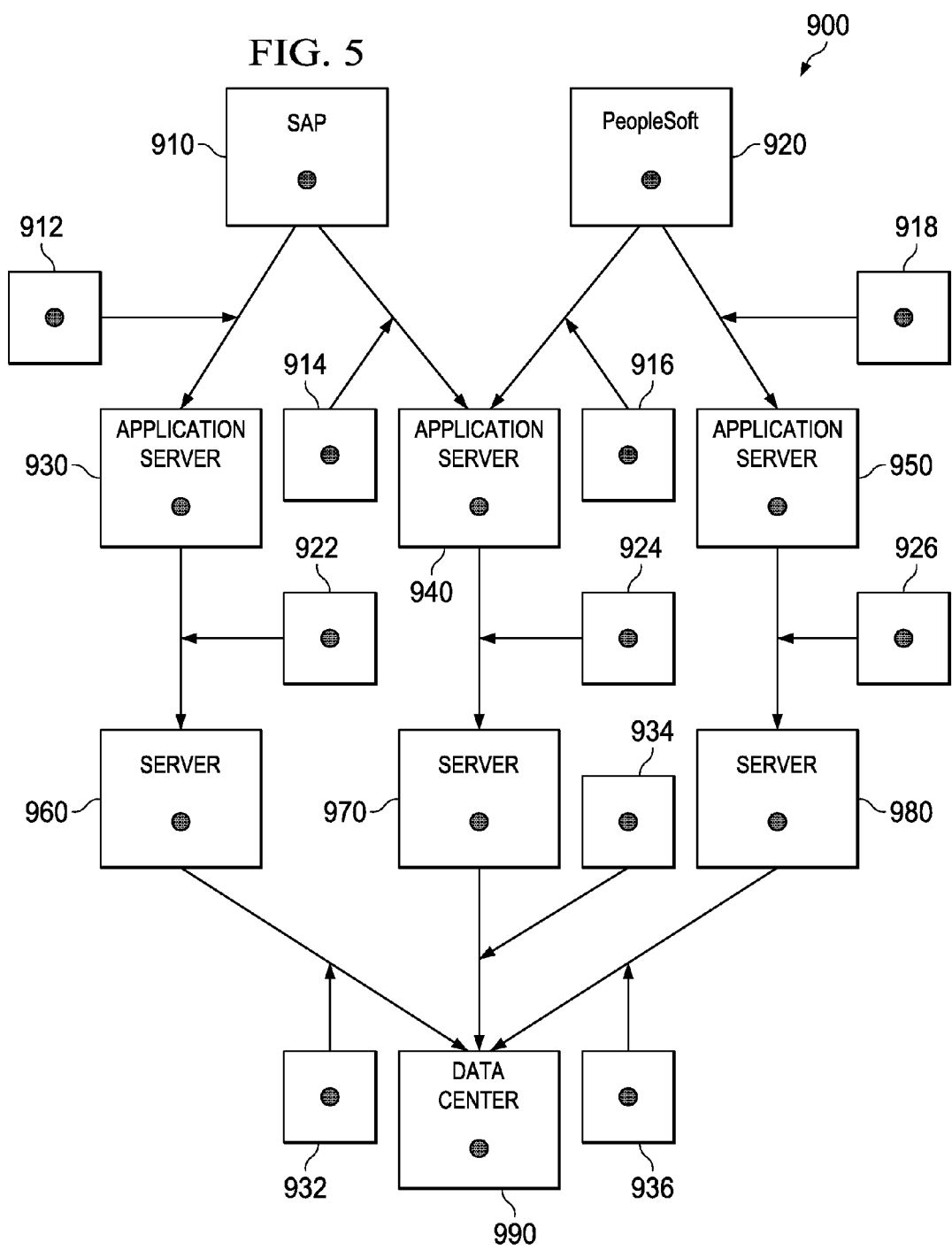

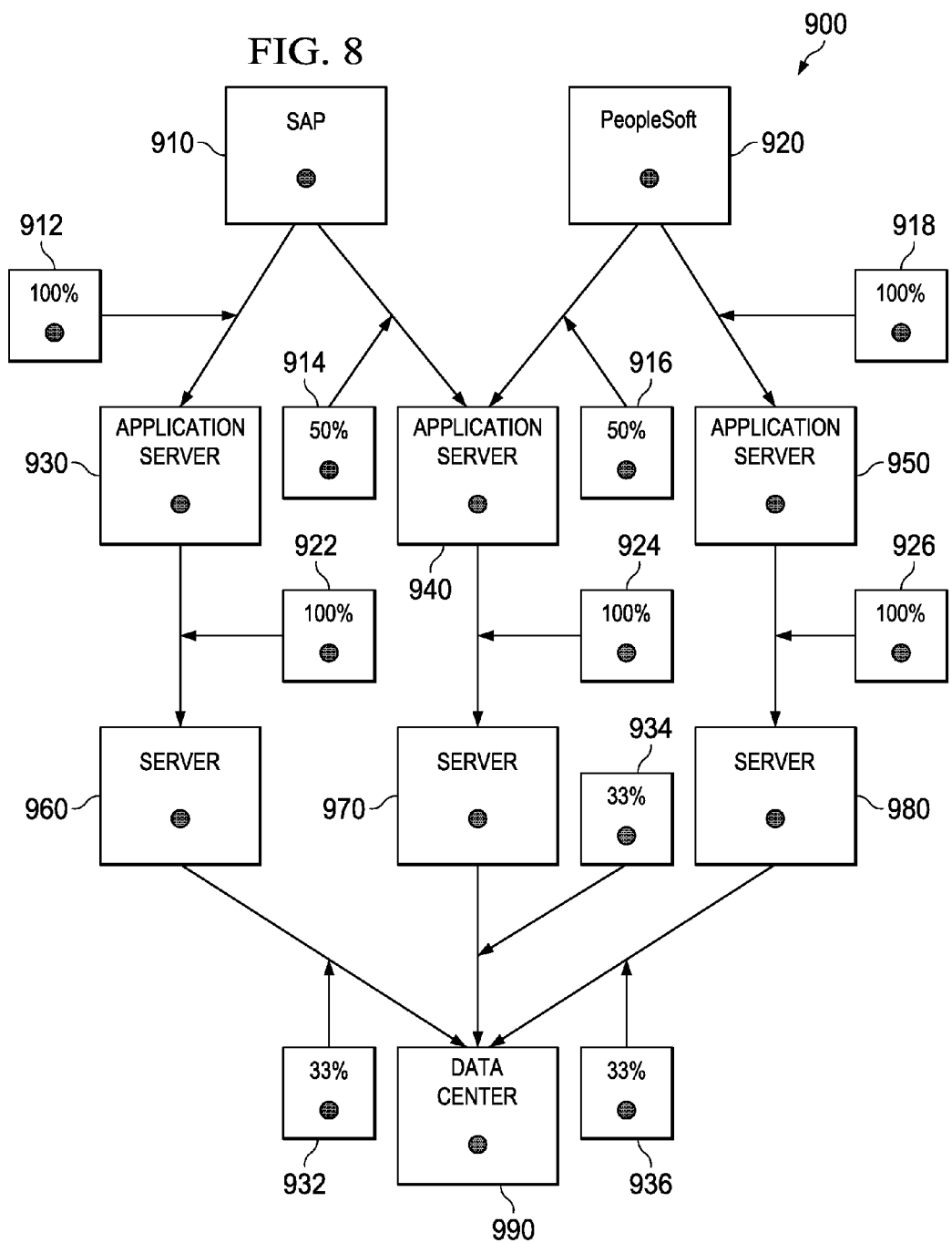

DEPENDENCY CHAINS AND PERCENTAGES FOR COST CALCULATION OF COMPONENT 910

| DEPENDENCY CHAIN | PERCENTAGE OF COST TO BE APPORTIONED |
|---|---|
| COMPONENT 910=>COMPONENT 930 | 100% |
| COMPONENT 910=>COMPONENT 940 | 50% |
| COMPONENT 910=>COMPONENT 930=>COMPONENT 960 | 100%x100%=100% |
| COMPONENT 910=>COMPONENT 940=>COMPONENT 970 | 50%x100%=50% |
| COMPONENT 910=>COMPONENT 930=>COMPONENT 960=>COMPONENT 990 | 100%x100%x33%=33% |
| COMPONENT 910=>COMPONENT 940=>COMPONENT 970=>COMPONENT 990 | 50%x100%x33%=16.5% |

1310

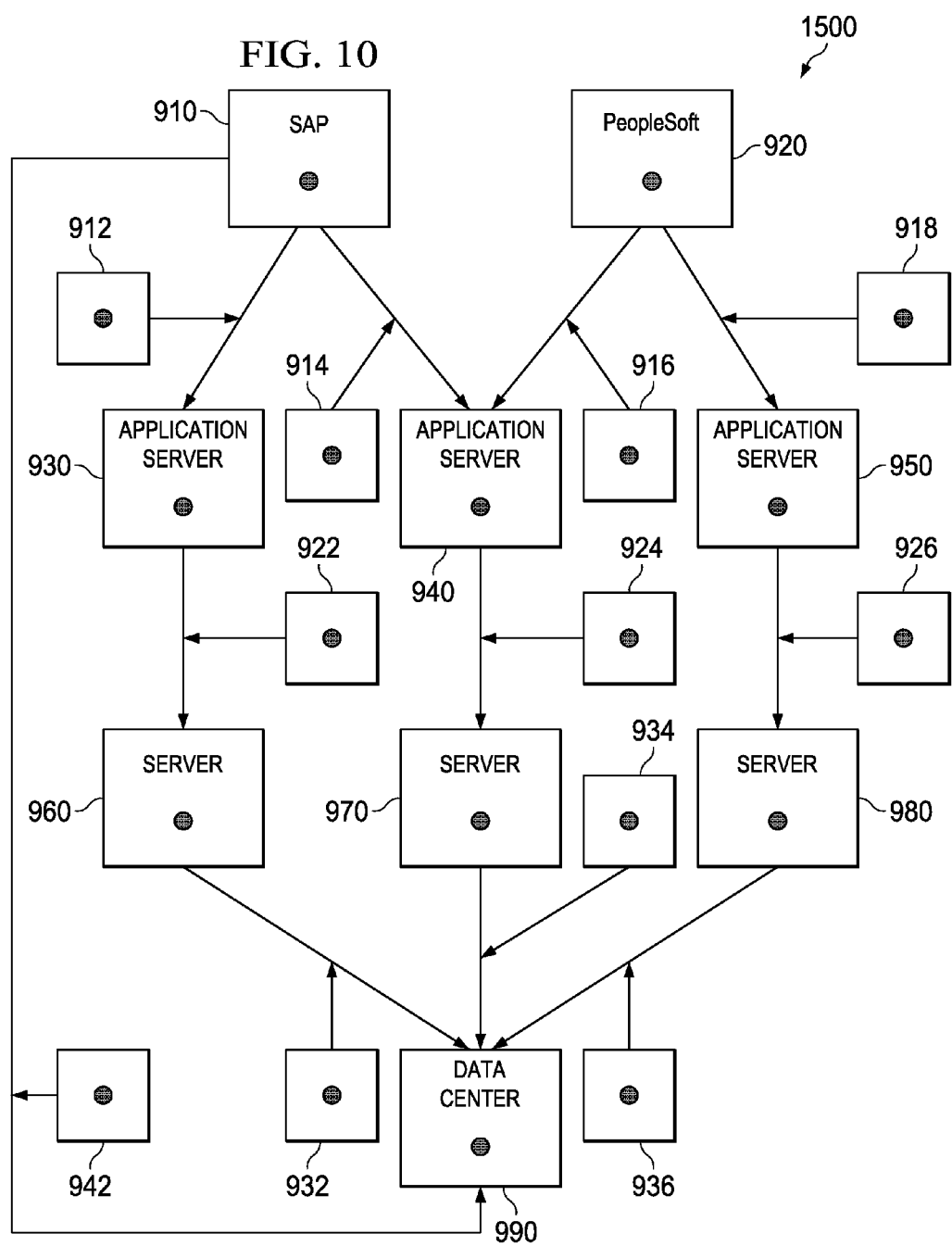

| COST MODEL | | |
|---|---|---|
| ASSET | REPRESENTED BY | COST (IN DOLLARS) |
| SAP DATABASE | COMPONENT 910 | 100,000 |
| SERVER | COMPONENT 960 | 50,000 |
| SERVER | COMPONENT 970 | 75,000 |
| SERVER | COMPONENT 980 | 450,000 |
| APPLICATION SERVER | COMPONENT 950 | 600,000 |
| APPLICATION SERVER | COMPONENT 930 | 300,000 |
| APPLICATION SERVER | COMPONENT 940 | 250,000 |
| DATA CENTER | COMPONENT 990 | 500,000 |
| PeopleSoft DATABASE | COMPONENT 920 | 1,000,000 |

FIG. 12

CALCULATION OF COST OF DEPENDENCIES TO CONTRIBUTE TO COST OF ASSET REPRESENTED BY COMPONENT 910

| DEPENDENCY CHAIN | CORRESPONDING ASSET CHAIN | PERCENTAGE TO BE APPORTIONED | COST CALCULATION | COST TO ATTRIBUTE |
|---|---|---|---|---|
| COMPONENT 910=> COMPONENT 930 | SAP DATABASE=> APPLICATION SERVER | 100% | 100%x300,000 | 300,000 |
| COMPONENT 910=> COMPONENT 940 | SAP DATABASE=> APPLICATION SERVER | 50% | 50%x250,000 | 125,000 |
| COMPONENT 910=> COMPONENT 930=> COMPONENT 960 | SAP DATABASE=> APPLICATION SERVER=> SERVER | 100%x100%=100% | 100%x50,000 | 50,000 |
| COMPONENT 910=> COMPONENT 940=> COMPONENT 970 | SAP DATABASE=> APPLICATION SERVER=> SERVER | 50%x100%=50% | 50%x75,000 | 37,500 |
| COMPONENT 910=> COMPONENT 930=> COMPONENT 960=> COMPONENT 990 | SAP DATABASE=> APPLICATION SERVER=> SERVER=>DATA CENTER | 100%x100%x33%=33% | 33%x500,000 | 165,000 |
| COMPONENT 910=> COMPONENT 940=> COMPONENT 970=> COMPONENT 990 | SAP DATABASE=> APPLICATION SERVER=> SERVER=>DATA CENTER | 50%x100%x33%=16.5% | 16.5%x500,000 | 82,500 |
|  |  |  |  | TOTAL = 760,000 |

1610

* TOTAL COST OF ASSET REPRESENTED BY COMPONENT 910 = COST OF ASSET REPRESENTED BY COMPONENT 910 + TOTAL COST TO CONTRIBUTE FROM DEPENDENCIES = 100,000 + 760,000 = 860,000

| PATH | | |
|---|---|---|
| 1 | CUSTOMER | HOUSEHOLD INCOME |
| 2 | CUSTOMER | PURCHASES/ORDERS → DATE |
| 3 | CUSTOMER | PURCHASES/ORDERS → RETURNED |
| 4 | CUSTOMER | PURCHASES/ORDERS → ORDER ITEMS → QUANTITY |
| 5 | CUSTOMER | PURCHASES/ORDERS → ORDER ITEMS → PRODUCT → PRODUCTION COST |
| 6 | CUSTOMER | PURCHASES/ORDERS → ORDER ITEMS → PRODUCT → UNIT PRICE |
| 7 | CUSTOMER | SUPPORT INCIDENTS → INCIDENT DATE |
| 8 | CUSTOMER | SUPPORT INCIDENTS → TIME TO RESOLUTION |
| 9 | CUSTOMER | ONLINE REVIEWS → DATE |
| 10 | CUSTOMER | ONLINE REVIEWS → NUMBER OF STARS |

FIG. 16

| CUSTOMER | PURCHASES/ORDERS | ORDER ITEMS | PRODUCT | PRODUCTION COST |
|---|---|---|---|---|

FIG. 17

FIG. 18B
```
Query name:appsAndProductCountQuery
  ObjectsOfType name:allApplications
    DataCompletenessProjector name:prodCnt DC%
    CountProjector name:prodCnt
    Aggregated SubQuery:
      ReferenceProperty name:appToModuleForProduct, refProp:/t/q#ApplicationHasSoftwareModule_CR:0
      ReferenceProperty name:moduleToPV, refProp:/t/q#SoftwareModuleRunsProductVersion_CR:1
      ReferenceProperty name:pvToProduct, refProp:/t/q#ProductHasProductVersion_CR:0
```

FIG. 18C

| NAME | PRODUCT COUNT | DATA COMPLETENESS (%) |
|---|---|---|
| APPLICATION 1 | 2 | 40 |
| APPLICATION 2 | 0 | 0 |
| APPLICATION 3 | 0 | 0 |
| APPLICATION 4 | 0 | 0 |

DATA COMPLETENESS FOR: apps: App 1 name:prodCnt,STEP METRIC: invocation count=1, has value count=1, fraction=1.0, PATH METRIC SO FAR: invocation count=1, has value count=1, fraction=1.0 name:appToModuleForProduct, STEP METRIC: invocation count=5, has value count=5, fraction=1.0, PATH METRIC SO FAR: invocation count=5, has value count=5, fraction=1.0 name:moduleToPV, STEP METRIC: invocation count=5, has value count=3, fraction=0.6, PATH METRIC SO FAR: invocation count=25, has value count=15, fraction=0.6 name:pvToProduct, STEP METRIC: invocation count=3, has value count=2, fraction=0.6666666666666666, PATH METRIC SO FAR: invocation count=75, has value count=30, fraction=0.4

1820 →

DATA COMPLETENESS FOR: apps: App 2 name:prodCnt, STEP METRIC: invocation count=1, has value count=1, fraction=1.0, PATH METRIC SO FAR: invocation count=1, has value count=1, fraction=1.0 name:appToModuleForProduct, STEP METRIC: invocation count-1, has value count=1, fraction=1.0, PATH METRIC SO FAR: invocation count=1, has value count=1, fraction=1.0 name:moduleToPV, STEP METRIC: invocation count=1, has value count=0, fraction=0.0, PATH METRIC SO FAR: invocation count=1, has value count=0, fraction=0.0 name:pvToProduct, STEP METRIC: invocation count=0, has value count=0, fraction=NaN, PATH METRIC SO FAR: invocation count=0, has value count=0, fraction=NaN

DATA COMPLETENESS FOR: apps: App 3 name:prodCnt, STEP METRIC: invocation count=1, has value count=1, fraction=1.0, PATH METRIC SO FAR: invocation count=1, has value count=1, fraction=1.0 name:appToModuleForProduct, STEP METRIC: invocation count=1, has value count=1, fraction=1.0, PATH METRIC SO FAR: invocation count=1, has value count=1, fraction=1.0 name:moduleToPV, STEP METRIC: invocation count=1, has value count=0, fraction=0.0, PATH METRIC SO FAR: invocation count=1, has value count=0, fraction=0.0 name:pvToProduct, STEP METRIC: invocation count=0, has value count=0, fraction=NaN, PATH METRIC SO FAR: invocation count=0, has value count=0, fraction=NaN

1840 →

DATA COMPLETENESS FOR: apps: App 4 name:prodCnt, STEP METRIC: invocation count=1, has value count=1, fraction=1.0, PATH METRIC SO FAR: invocation count=1, has value count=1, fraction=1.0 name:appToModuleForProduct, STEP METRIC: invocation count=1, has value count=0, fraction=0.0, PATH METRIC SO FAR: invocation count=1, has value count=0, fraction=0.0 name:moduleToPV, STEP METRIC: invocation count=0, has value count=0, fraction=NaN, PATH METRIC SO FAR: invocation count=0, has value count=0, fraction=NaN name:pvToProduct, STEP METRIC: invocation count=0, has value count=0, fraction=NaN, PATH METRIC SO FAR: invocation count=0, has value count=0, fraction=NaN

FIG. 18F

| /m#dataCompletenessQuery -> /m#apps: , counts=4 -> 4, elapsed: 0.906 ms, or 226.5 microsec/invocation |
| --- |
| /m#apps -> /m#prodCnt: , counts=4 -> 4, elapsed: 0.69 ms, or 172.5 microsec/invocation |
| /m#apps -> /m#appToModuleForProduct: , counts=8 -> 7, elapsed: 0.142 ms, or 17.75 microsec/invocation |
| /m#appToModuleForProduct -> /m#moduleToPV: , counts=7 -> 3, elapsed: 0.146 ms, or 20.857142857142858 microsec/invocation |
| /m#moduleToPV -> /m#pvToProduct: , counts=3 -> 2, elapsed: 0.136 ms, or 45.333333333333336 microsec/invocation |

METHOD AND SYSTEM FOR DETERMINATION OF DATA COMPLETENESS FOR ANALYTIC DATA CALCULATIONS

TECHNICAL FIELD

This disclosure relates in general to modeling data, and more particularly, to determining a measure of data completeness associated with a metric of interest extracted from a data model.

BACKGROUND

The world is comprised of a wide and varied assortment of environments and subsystems. Many environments present challenges to sufficiently accurate modeling. A microcosm of this problem occurs in many enterprise architectures. These enterprise architectures may be intended to have a wide variety of uses: disseminating information about goods and services offered through a site on the World Wide Web, achieving objectives related to a business concern, providing a programming infrastructure for development of software, or keeping track of sales and sales force information.

Consequently, these enterprise architectures grow organically, sewn together in a Frankenstinian manner from a variety of heterogeneous machines and applications. Predicting the effects of business initiatives process and organization, the interaction of applications, infrastructure and data organization within an IT environment, etc., on these enterprise architectures is almost an exercise in futility without some sort of model. However, modeling these types of environments is a daunting prospect.

Typically, there are two approaches to creating models for enterprise architectures. The first is to create a diagram or a spreadsheet based inventory of the items of interest. This approach is problematic, as creating these models requires an in depth evaluation of an enterprise architecture and manual creation of the documents, and whole document retention systems must be kept in place to version and store the documents associated with these types of models. Additionally, changes to the enterprise architecture wreak havoc on these models. The effects from these changes must be manually traced through each of the diagrams, which are not only particularly prone to errors, but time consuming as well. Other problems with storing these models in documents include that there may be a large number of users who need to be able to access and modify these documents and documents of this type don't lend themselves to concurrent modification, and that it is very difficult to cross-reference information across these documents.

The second approach, equally problematic, is to store items of interest of an enterprise architecture in a relational database. Models created with a relational database, however, are particularly susceptible to changes in the enterprise architecture itself. Adding layers, applications, dependencies, projects, geographical locations, etc., to an enterprise architecture may require changes to a table schema implementing the model, which may in turn entail revising all the SQL statements used to implement the database. Furthermore, as enterprises tend to be heterogeneous, importing data to populate such databases may be difficult, as the data may be contained in a large number of disparate and heterogeneous repositories (if, indeed, such data exists at all).

As can be seen then, it may be extremely difficult to both create a data model for an enterprise architecture and to actually populate that data model with data. A microcosm of these problems occurs with respect to calculating a metric of interest with respect to these enterprise architectures. For example, one metric of interest may be the cost of an asset. The cost of an asset within an enterprise architecture may go beyond the direct cost of purchasing and maintaining that asset. In many cases, the true cost of an asset depends on the cost of the infrastructure and other resources needed to actually support or implement that asset. In other words, the total cost of a single asset may include the cost of portions of other assets, and the cost of those assets may depend on still other assets. Consequently, the actual cost of an asset may encompass both direct and indirect costs.

With the heterogeneity of enterprise architectures and the difficulty of creating accurate models of these enterprise architectures comes the related problem of data completeness. The calculation of a metric of interest using a data model of an enterprise architecture can only be as accurate as the data in the data model used to calculate the metric of interest. As discussed above, however, in many cases it may be difficult to populate such a data model with data. The sparseness of data in a data model may thus impact the ability to calculate a metric, or the accuracy of any metric calculated from such data.

As can be seen, a need exists for methods and systems for a generic data model which can model a complex enterprise architecture, and which is easily extensible to allow the representation of any desired logical or physical entity and the associations and dependencies between these entities. Furthermore, a need exists for methods and systems which can use these data models to calculate a metric of interest with respect to a modeled enterprise architecture and also calculate an associated measure of data completeness as an indication of such metrics.

SUMMARY OF THE DISCLOSURE

Embodiments disclosed herein may provide a measure of data completeness associated with an analysis of the data model such as the calculation of a metric of interest, to be calculated substantially in parallel with the analysis of the data model used to calculate the metric of interest. The measure of data completeness may provide a confidence as to the accuracy of the analysis. Using embodiments disclosed herein, a request for an analysis of an enterprise may be received by a system. The system may include a server operable to create and populate a data model of an enterprise, such that the data model includes components representing physical and logical entities in the enterprise. The system may also contain a set of instructions executable to receive a request for an analysis of the data model (or some part thereof), perform the analysis of the data model, and perform an analysis of the data completeness of the model with respect to the requested analysis, such that a measure of the data completeness is returned with the analysis. An analysis of the data completeness may include identifying all paths that the requested analysis requires, identifying each step in each path, performing some calculation or determination associated with each step, multiplying, aggregating or otherwise determining a data completeness for each path based on the data completeness for each step, and multiplying, aggregating or otherwise determining an overall data completeness associated with the requested analysis based on the data completeness based on the paths. In certain embodiments, calculation of a data completeness measure may be performed at each step (incrementally) in a path or may be performed after the path has been traversed (collectively), but is generally performed in parallel with the processing of any calculations associated with the analysis of the metric of interest.

BRIEF DESCRIPTION OF THE DRAWINGS

The following drawings form part of the present specification and are included to further demonstrate certain aspects of the invention. Embodiments of the invention may be better understood by reference to one or more of these drawings in combination with the detailed description of specific embodiments presented herein.

It is to be noted, however, that the appended drawings illustrate only exemplary embodiments and are therefore not to be considered limiting of its scope for the invention which may admit to other equally effective embodiments. In addition, although the figures may depict embodiments wherein the components represent different devices or locations, they can be combined into a single device or location. Also, a single component may be comprised of a combination of components.

FIG. 2 depicts a graphical representation of one embodiment of a component data structure;

FIG. 3 depicts a graphic representation of one embodiment of a relationship data structure;

FIG. 4 depicts a high level diagram of one embodiment of an enterprise architecture and a system for performing metric calculations;

FIG. 5 depicts a representation of one embodiment of an exemplary data model of an enterprise architecture;

FIG. 8 is a diagram illustrating one embodiment of an altered representation of the data model of FIG. 5;

FIG. 9 a representation of one embodiment of the dependency map determined by a graph traversal mechanism applied with respect to the data model of representation 900 and the percentages of the example depicted in FIG. 8;

FIG. 10 is a diagram illustrating one embodiment of an altered representation of the data model of FIG. 5;

FIG. 11 illustrates one embodiment of a cost model for the enterprise architecture represented by the data model of FIG. 5;

FIG. 12 depicts a representation of the results of the application of a cost model;

FIG. 16 depicts portions of the data model shown in FIG. 15 decomposed into paths;

FIG. 17 depicts the path shown in FIG. 16 decomposed into steps; and

FIGS. 18A-18F depict an exemplary data model, an exemplary query corresponding to a metric of interest for the data model, and sample output including data completeness measures corresponding to the metric of interest.

DETAILED DESCRIPTION

Figure 1:
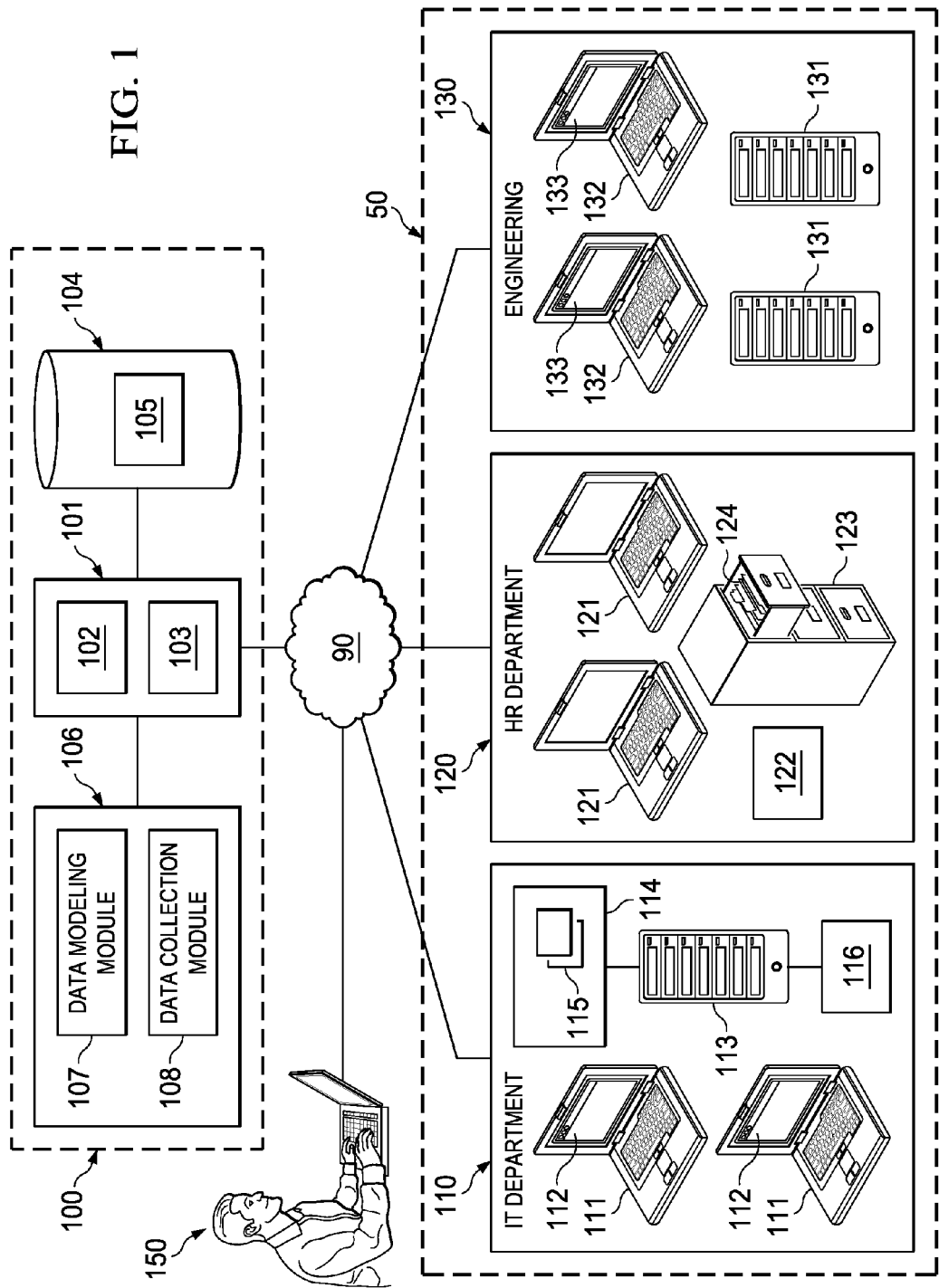
FIG. 1 depicts a high level diagram of one embodiment of an enterprise architecture and a system for creating a data model.

The detailed description and the specific examples described below, while indicating the preferred embodiments, are given by way of illustration only and not by way of limitation. Descriptions of known materials and manufacturing techniques may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

It should be understood that the inventive concepts disclosed herein are capable of many other modifications. To the extent such modifications fall within the scope of the appended claims and their equivalents, they are intended to be covered by this patent. It should also be understood that the term "a" as used herein generally means "one or more" and is not intended to be construed in a singular sense. In addition, the operations described in connection with the methods of the disclosure need not necessarily be executed in the sequence described, as they may be executed in a different sequence consistent with the principles of the disclosure.

In an illustrative embodiment of the invention, computer-executable instructions may be lines of assembly code or compiled C++, Java, or other language code. Other architectures may be used. Additionally, a computer program or its software components with such code may be embodied in more than one data processing system readable medium in more than one computer.

Embodiments disclosed herein may be useful for determining a measure of data completeness for an analysis of an enterprise based on a data model. To provide context for how a measure of data completeness may be useful, a description of an exemplary analysis and data completeness calculation may be helpful.

An enterprise may refer to any business operation that can vary from being a small company with a single employee to a conglomerate spread out globally with thousands of employees, computers and other machines via a network, etc., to market its own product or service. Each enterprise may be unique in terms of people, buildings and other property, equipment, assets, etc., how the enterprise functions, business rules the enterprise follows, departments, etc. While embodiments herein have been described with respect to an enterprise or an enterprise architecture it will be noted that other embodiments may be equally well applied in other contexts, and the use of an enterprise architecture to illustrate embodiments herein should not be taken as placing any restrictions on the applicability of these embodiments.

FIG. 1 depicts a diagram illustrating one embodiment of a simplified architecture of an enterprise 50 where elements of the enterprise 50 may be coupled via network 90 to system 100. Enterprise 50 may have variety of departments or other divisions. For example, enterprise 50 may include an IT department 110, a human resources department 120, and engineering department 130. Each department may further include equipment, machines, storage, etc., to support that department. For example, IT department 110 may have computers 111 running applications 112, server 113 having database 114 storing spreadsheets 115 with information about various computers located in IT department 110, HR department 120 and engineering department 130. HR department 120 may include computers 121 and employee database 122 storing information about employees working in IT department 110, HR department 120 and engineering department 130, as well as a physical file cabinet 123 storing employee files, government compliance records, and other data in hard copy 124. Engineering department 130 may have servers 131 and computers 132 running applications 133 operable to perform research and development of products, manage supply chain contacts, and other logistics, etc.

In order for an enterprise to maintain control over its operations, it may be desirable to capture data about the architecture (e.g. the entities and relationships of) enterprise 50. Data model 105 may be used to model physical and logical entities, systems, etc., in an enterprise architecture, which may allow a user at computer 150 to, for example, evaluate the effectiveness of a business project, process, division, etc. or otherwise obtain data on the architecture of enterprise 50. Data model 105 may use components and relationships to model enterprise 50. Within this example, the term "component" is intended to mean a representation of any definable, logical or physical entity or asset. A component may have a group of properties. For example, an entity or asset may be any portion of enterprise 50 desired to be represented, including hardware, such as servers 113 or 131 or databases 114 or 122, applications 112 or 133 which may reside on one or more actual machines, virtual data repositories, firmware and the like. Many levels of abstraction are possible. For example, a network may be represented as a component, a subnetwork of that network may be represented as a component, a server on the subnetwork may also be represented as a component, an application running across that server and other servers may also be represented as a component, a table within that application may be represented as a component, etc. "Relationships" may be used in tandem with components to model systems and environments by representing an association or dependencies between two components. Additional examples of how data model 105 may be used to model enterprise 50 may be found in U.S. Pat. No. 7,698,683 issued Apr. 13, 2010, to Miller et al., U.S. Pat. No. 7,558,790 issued Jul. 7, 2009 to Miller et al., and 7,523,128 issued Apr. 21, 2009, to Miller et al., each of which is fully incorporated by reference herein.

Returning to FIG. 1, system 100 may be useful for modeling enterprise 50. System 100 may include server 101 having CPU 102 and memory 103 having a set of instructions executable by CPU 102 to communicate via network 90 to elements of enterprise 50 coupled to the network 90 to gather data related to modeling enterprise 50 as well as data for collecting and populating into data model 105 stored in repository 104. Modeling of data may be performed by data modeling module 107 operating on data modeling system 106. Modeling may involve communicating with computers and other machines in enterprise 50 (e.g. by data collection module 108) to identify operating systems, applications running thereon, repositories storing information, etc. or obtaining data from these various data sources in the enterprise 50, as well as receiving information from users via manual entry about other physical or logical entities to be modeled. Data modeling module 107 may receive information about various physical and logical entities (e.g. from data collection module 108), instantiate components to represent these entities, and associate relationships with various components to model enterprise 50 using data model 105, and may communicate with repository 104 to store data model 105 therein.

FIG. 2 depicts a graphical representation of one embodiment of a component data structure capable of representing a physical or logical entity in enterprise 50. Component 200 is a generic component which may be used to represent a logical or physical entity within enterprise 50. Component 200 may have a set of fields 210 which contain information relating to the entity associated with component 200. Fields 210 may include a field for name 220, description 230, properties 240 and checks 250. Various other fields 210 may be included to further define component 200. Name field 220 may be used to particularly associate component 220 with a specific physical or logical entity. Description field 230 may further identify component 200, associate component 200 with a particular entity, or allow component 200 to be associated with a particular component type (as explained below).

Property field 240 may be used to represent the attributes or characteristics of the physical or logical entity represented by component 200, or with which component 200 is associated. Property field 240 may be associated with one or more properties, a property may consist of a property name which may be associated with a value. This value in turn may correspond to an attribute of the physical or logical entity represented by component 200. A property may be a string, boolean, decimal number, date/time, or an enumerated type, which describes the category of values a particular property may have. In one embodiment, a property may in turn be a data structure which has a name, a description, and a value. This data structure may then be given values based on an attribute of the entity represented by component 200.

Component 200 may be used to represent any object in enterprise 50. For example, to represent server computer 113, name field 220 may be set to "ITDeptServer", description 230 may be set to "server computer", property field 240 may contain three properties "OSType", "RAM", and "FreeStorage", which may be assigned the values corresponding to attributes 112 of server computer 110, "Solaris", "8 MB" and "6 MB" respectively. Similarly, component 200 may represent IT department database 114; name field 220 may be set to "ITDeptDB", description 230 may be set to "database server application", property field 240 may contain three properties "OSType", "Footprint", and "Listen Port", which may be assigned the values corresponding to attributes of database server 114, "Solaris", "12 MB" and "2100" respectively. As can be seen, component 200 may represent any entity, whether logical or physical equally well.

FIG. 3 depicts a graphic representation of one embodiment of a relationship data structure. Relationship 300 may be used to represent an association or dependency between two or more components 200. Relationship 300 may have a set of fields 310 which contain information pertinent to an association or dependency between two components. Fields 310 may include a field for name 320, description 330, property 340, and checks 350 as described above with respect to component 200.

Name field 320 may be used to particularly associate relationship 300 with two or more physical or logical entities. In one embodiment, the name associated with name field 320 may be built programmatically based on the relationship type name and the names of the two components it is connecting. So, a "runs on" relationship type exists between component "ITDeptDB" and "ITDeptServer", the relationship name may be built automatically as "ITDeptDB runs on ITDeptServer". That way, if either of the components' names changes, the relationship name may automatically change to reflect this. Description field 330 may further distinguish relationship 300, associate relationship 300 with components, or allow relationship 300 to be associated with a particular relationship type (as explained below). Property field 340 may allow attributes of the relationships, dependencies between the relationships, or associations between the relationships, to be represented by a name and value pair. Checks 350 may contain one or more pieces of logic which perform operations based on certain set of conditions, as described above with respect to relationship 300. In a particular embodiment, fields 310 include fields 360, 370 to identify components 200 to which relationship 300 corresponds. Various other fields 310 may be included to further define relationship 300.

Those skilled in the art will appreciate that changes to a particular environment can be easily accommodated by data model 105 with a minimum of change to the actual data structures which represent the enterprise architecture.

To populate data model 105, then, data may be collected from the various data sources maintained by the various parts/areas of enterprise 50 and populated into data model 105 stored in repository 104. Returning to FIG. 1, in some embodiments, data collection module 108 operating on computer 106 may communicate with enterprise 50 via network 90 (e.g., computers or other elements of enterprise architecture coupled to network 90) to collect data about enterprise 50. Collection of data may be performed automatically, such as according to a predetermined event or time period, may include sending requests to various computers or machines in enterprise 50, may include sending a request to a human user to input data, or the like. Examples and further description of how data may be collected from various sources may be found in U.S. Pat. No. 7,822,710 issued Oct. 26, 2010 to Miller et al, and is incorporated by reference herein. Data collection module 108 may further communicate with data modeling module 107 or repository 104 to populate data into data model 105 stored therein.

As can be seen, data model 105 may be populated using data collected from a variety of data sources. However, data model 105 may not provide a complete representation of enterprise 50. The sparseness of data model 105 (e.g., incompleteness of data with respect to elements of the enterprise architecture 50) may be attributed to any number of factors, including human errors, incorrect or missing data, poor communication between computers and other network devices, etc. For example, manual data entry is subject to human errors in finding the information and entering the data correctly, automated data collection is subject to proper connectivity and interface compatibility, and sending requests for data may be subject to proper passwords or authentication.

Even so, often times after a particular enterprise architecture is modeled using components and relationships, data model 105 of the enterprise 50 may be applied to the management and analysis of the enterprise 50. The management and analysis of data may involve the calculation of a metric of interest. Such metrics may include, for example, the cost of an asset within the enterprise, the impact of asset on the functioning of an enterprise, or any other metric which can be calculated using the components and relationships of the data model. For example, one particularly useful application of data model 105 is the calculation of the metric of interest of cost. Specifically, the cost of various assets that comprise enterprise 50 can be calculated, where the calculation of the cost of any particular asset takes into account not only the direct dependencies and costs of that particular asset, but the indirect dependencies and costs of that asset as well. Using data model 105 of enterprise 50, the dependency chains for one or more components of data model 105 can be discovered and a dependency map created. Using the costs associated with the components in the dependency chains of a particular component, the cost of that particular component can be calculated.

Thus, a system that includes a data modeling system may also include a system for determining a metric of interest using a data model created by the data modeling system. FIG. 4 depicts a diagram illustrating one embodiment of enterprise 50 coupled via network 90 to system 100 as shown in FIG. 1 and described above, and includes metric calculation system 501 having a processor and set of instructions executable to communicate with repository 104 and network 90, and further includes metric calculation module 505. In some embodiments, metric calculation module 505 may communicate with repository 104 to access data model 105, may communicate with computer 101 to access data model 105, or otherwise have access to components and relationships in data model 105 representing enterprise 50. Metric calculation module 505 may utilize data model 105 to evaluate an aspect of enterprise 50 by calculating a metric of interest related to one or more components or relationships of the data model 105. Evaluating an aspect of enterprise 50 may involve determining and assigning costs or revenues to assets of the enterprise 50, determining the effects of a change to enterprise 50, or the like as described above. Costs may include direct financial costs, or may be expressed in terms of man-hours, energy usage, or some other aspect. Similarly, revenues may include direct financial revenues, or may be expressed in terms of savings, investments, etc.

An example may be helpful in describing the systems and methods used to calculate a metric of interest for a data model. Turning to FIG. 5, a representation 900 of an exemplary data model of an enterprise which will be used in conjunction with various descriptions of the embodiments of the invention is depicted. Components 910 and 920 represent an SAP and a PeopleSoft database respectively. Components 930, 940 and 950 represent application server applications, components 960, 970 and 980 represent hardware servers and component 990 represents the physical location of a data center. Relationships 912-918 are directional "runs on" relationships (the direction of which is indicated by the arrow). Relationship 912 represents that the SAP database represented by component 910 executes on the application server represented by component 930. Similarly, relationship 914 represents that the SAP database represented by component 910 executes on the application server represented by component 940, relationship 916 represents that the PeopleSoft database represented by component 920 executes on the application server represented by component 940, and relationship 918 represents that the PeopleSoft database represented by component 920 executes on the application server represented by component 950.

Relationships 922-926 are also directional "runs on" relationships. Relationship 922 represents that the application server represented by component 930 executes on the hardware server represented by component 960. Similarly, relationship 924 represents that the application server represented by component 940 executes on the hardware server represented by component 970 and relationship 926 represents that the application server represented by component 950 executes on the hardware server represented by component 980.

Relationships 932-936 may be directional "located in" relationships, such that relationship 932 represents that the hardware server represented by component 960 is located in the data center represented by component 990; relationship 934 represents that the hardware server represented by component 970 is located in the data center represented by component 990 and relationship 936 represents that the hardware server represented by component 980 is located in the data center represented by component 990.

As can be seen from representation 900, determining a metric of interest such as the cost of most assets corresponding to components in a data model depends not only on the direct cost of the asset represented by that component, but also includes at least a portion of the cost of the other assets on which it depends. For example, the total cost of the SAP database represented by component 910 may encompass: the direct cost of the SAP database represented by component 910 and some part of the total cost of the application servers represented by components 930 and 940. The costs of the application server represented by component 930 in turn includes the direct cost of the application server represented by component 930 and some part of the cost of the server represented by component 960. The costs of the application server represented by component 940 in turn includes the direct cost of the application server represented by component 940 and some part of the cost of the server represented by component 970. The cost of the servers represented by components 960 and 970, likewise includes the direct cost of these servers, and some portion of the cost of the data center represented by component 990. Thus, the total cost of the SAP data base represented by component 910 includes some portion of the cost of the application servers represented by components 930 and 940, some portion of the cost of the hardware servers represented by components 960 and 970, and some portion of the cost of the data center represented by component 990.

As can be imagined, the more complex data model 105 becomes, the more complicated any methodology becomes to determine the dependencies of a component in the data model and commensurately the more complicated it becomes to calculate an accurate metric of interest (e.g. cost, revenue, customer satisfaction) in an enterprise represented by a data model.

Figure 6:
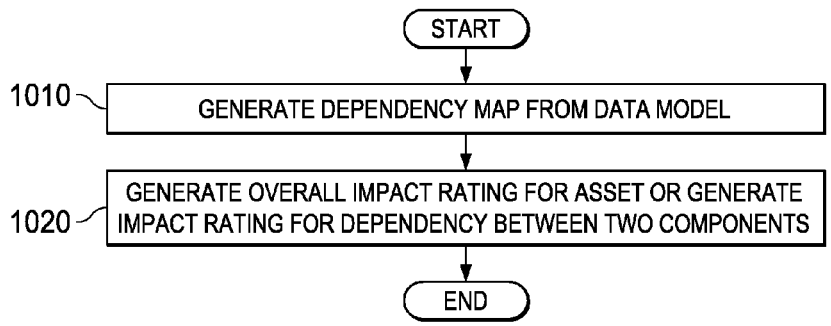
FIG. 6 depicts a flow diagram of one embodiment of a methodology to calculate a cost for an asset in an enterprise architecture.

To help further illustrate the calculation of a metric of interest, FIG. 6 presents one embodiment of a methodology for determining the dependencies and the metric of interest of cost for components of data model 105. First, at step 1010, a dependency map may be generated from data model 105. This dependency map may then be applied, at step 1020, to a cost structure to generate a metric of interest (e.g., cost in this example) for a particular component of data model 105 at step 1030.

In one embodiment, to create a dependency map (step 1010) data model 105 may be analyzed to generate a set of first level dependencies for one or more components in data model 105. To determine these first level dependencies for a component a set of relationships associated with the component is evaluated to determine if the relationship indicates dependency on another component by analyzing the directionality of the relationship. If the relationship indicates that the component is dependent on another component, the relationship may be further analyzed to see if it is a cost conferring relationship. This analysis may be accomplished by comparing the relationship against a set of relationships which have been designated as cost conferring relationships. If the relationship is a cost conferring relationship indicating dependency on another component this dependency may be indicated in the set of first level dependencies for that component.

Again it is helpful to utilize the exemplary data model presented in FIG. 5 for illustration. For example, to determine the first level dependencies of component 910 each of relationships 912 and 914 is evaluated to determine if these relationships 912, 914 indicate that component 910 is dependent on other components, and whether these are cost conferring relationships. In this case, as relationships 912 and 914 are both directional "runs on" relationships it will be indicated that the first level dependencies of component 910 are components 930 and 940.

Figure 7:
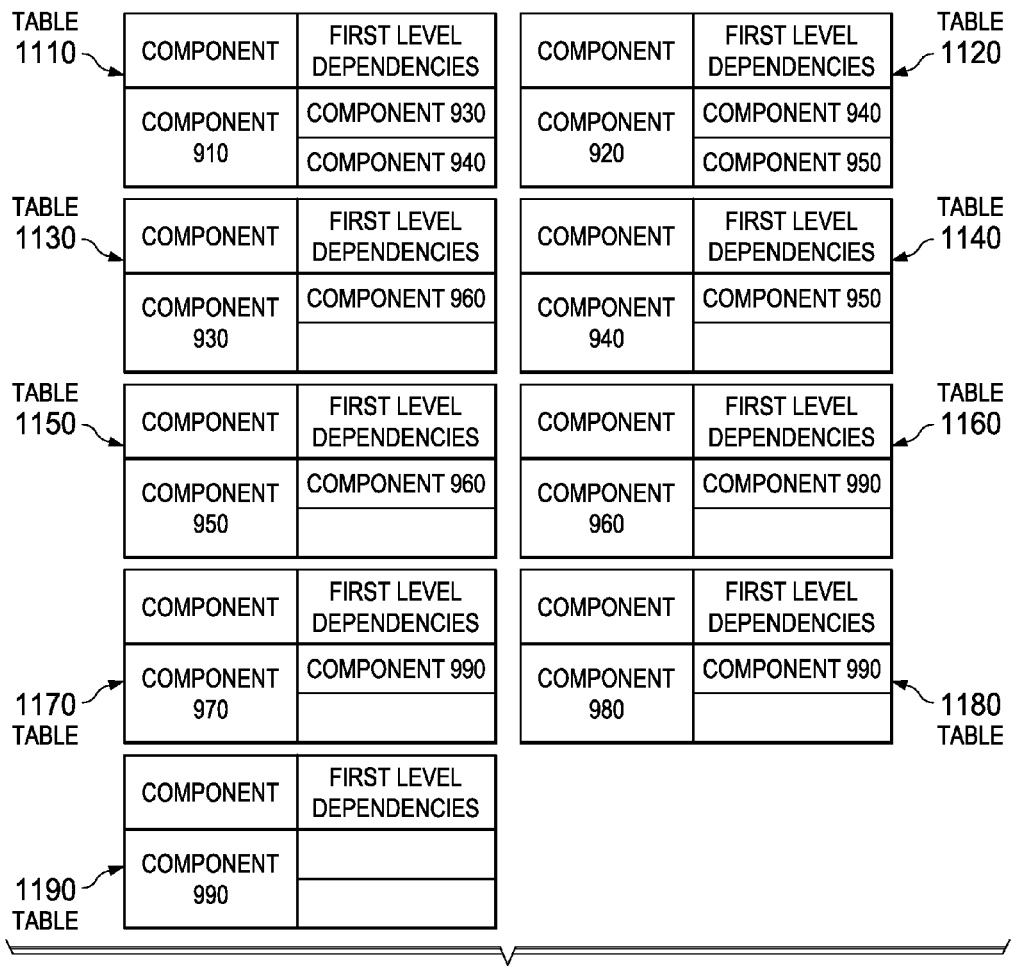
FIG. 7 depicts an example of a set of tables indicating the first level dependencies of each component in the data model of FIG. 5.

In one embodiment, the evaluation of a data model to determine first level dependencies results in a set of tables, with the tables indicating the first level dependencies of some set or subset of the components in the data model. FIG. 7 depicts an example of a set of tables indicating the first level dependencies of each component in the data model of FIG. 5. More specifically, table 1110 indicates the first level dependencies of component 910; table 1120 indicates the first level dependencies of component 920; table 1130 indicates the first level dependencies of component 930; table 1140 indicates the first level dependencies of component 940; etc.

Based on these first level dependencies, the total cost of a component can be apportioned among the components that depend on that component. To apportion the total cost of a component, each relationship associated with that component may be evaluated to determine if the relationship indicates that another component is dependent on the component by analyzing the directionality of the relationship. If the relationship indicates that another component is dependent on the component, the relationship may be further analyzed to see if it is a cost conferring relationship.

In one embodiment, the cost of a component is apportioned evenly between all relationships that indicate dependency on that component and are cost conferring. To relate this once again to the example of FIG. 5, suppose we are apportioning the cost of the application server represented by component 940. Here, each of relationships 914 and 916 is evaluated to determine if these relationships 914, 916 indicate that other components are dependent on component 940, and whether these are cost conferring relationships. In this case, as relationships 914 and 916 are both directional "runs on" relationships both of these relationships 914, 916 fulfill that criteria, and the cost of component 940 may be apportioned evenly between relationships 914, 916. In this manner, cost apportionments may be associated with cost conferring relationships in data model 105.

FIG. 8 depicts a representation of the above methodology applied to the data model of FIG. 5. Notice that each relationship 912, 914, 916, 918, 922, 924, 926, 932, 934 and 936 has a percentage associated with it. This percentage, which may be called an attribution percentage, indicates the proportion of the cost of a component which should be attributed to another component when calculating the cost of the other component. For example, the percentage associated with relationship 934 indicates that 33% of the cost of the data center represented by component 990 should be attributed to the server represented by component 970.

In another embodiment, the percentage cost of one component which should be attributed to another component may be assigned or associated with a relationship at an earlier point, such as when the relationship is instantiated. These percentages may then be used instead of proportioning the cost of a component equally between relationships associated with the component. This approach may be problematic, however, as enterprise architectures tend to be fluid entities. Thus, the data models that represent these enterprise architectures tend to be fluid as well. Occasionally, as a result of these changes the percentages originally associated with relationships may not account for 100% of the cost of a component. In this case, the percentages assigned to the relationships for a various component may still be used to apportion the full cost of that component, however, these percentages will be scaled to account for the full cost of the component.

To illustrate, suppose relationship 914 indicates that 30% of the cost of the server represented by component 940 should be apportioned to component 910, while relationship 916 indicates that 20% of the cost of the server represented by component 940 should be apportioned to component 920. To utilize the same relative apportionment of the cost of the server represented by component 940 while still proportioning the full cost of the server, these percentages may be scaled to account for 100% of the cost. As a result, the percentage associated with relationship 914 may be scaled up to 60% and the percentage associated with relationship 916 may be scaled up to 40%. As can be imagined, the same process may be applied to scale down percentages that account for greater than 100% of the cost of an asset.

After the first level dependencies for the components of a data model are determined, and the cost of components apportioned, the deeper dependencies of the component in the data model may be determined. Returning to FIG. 7, tables 1110-1190 of first level dependencies may be used to determine all the dependencies either direct or indirect for one or more of the components in the data model. In one particular embodiment, the determination of these dependencies may be determined by running a graph traversal algorithm on the data model, or alternatively, on tables 1110-1190 representing the first level dependencies of components in the data model to create a dependency map for the component or the graph traversal algorithm may determine all the dependencies of one or more components.

In addition to determining dependencies for a component, the graph traversal algorithm may also determine the proportion of the cost of each various components on which a component is dependent that should be apportioned to the component based on the data model.

The graph traversal algorithm may start at a component for which it is desired to determine the cost. It can then find each component on which the component depends in the first degree by following the relationships associated with the component, and calculate the percentage cost that should be apportioned from each of those first degree components to the component. From these first degree components, components on which the component depend in the second degree may be found by following the relationships from each of the first degree components to the second degree components, and the percentage cost that should be apportioned from each of these second degree components to the component calculated. This percentage may be calculated for a second degree component by multiplying the percentage associated with the relationship linking the second degree component to a first degree component with the percentage linking the first degree component with the component itself. This graph traversal mechanism may similarly continue until every component on which the original component depends is found, and the percentage of the cost of every component on which the component depends to apportion to the original component is determined.

Referring to FIG. 8, suppose that it is desired to calculate the cost of SAP database represented by component 910. The graph traversal algorithm may start at component 910 and determine that component 910 is dependent on components 930 and 940, additionally the graph traversal algorithm may determine that 100% of the cost of component 930 should be apportioned to component 910, while 50% of the cost of component 940 should be apportioned to component 910. The graph traversal algorithm may then find the second degree dependencies of component 910 by finding the dependencies of component 930 and 940. The graph traversal algorithm finds that component 930 depends on component 960. Thus, component 910 depends on component 960 in the second degree. By multiplying the percentage associated with relationship 912 and relationship 922, it can be determined that 100% of the cost of component 960 should be apportioned to component 910. Similarly, the graph traversal algorithm may find that component 940 depends on component 970. Thus, component 910 depends on component 970 in the second degree. By multiplying the percentage associated with relationship 914 and relationship 924, it can be determined that 50% of the cost of component 960 should be apportioned to component 910.

The graph traversal algorithm may then find the third degree dependencies of component 910 by finding the dependencies of component 960 and 970. The graph traversal algorithm finds that component 960 depends on component 990. Thus, component 910 depends on component 990 in the third degree. By multiplying the percentage associated with relationships 912, 922 and 932 it can be determined that 33% of the cost of component 990 should be apportioned to component 910. Additionally, the graph traversal algorithm may find that component 970 depends on component 990. Thus, component 910 depends on component 990 in the third degree. By multiplying the percentage associated with relationships 914, 924 and 934 it can be determined that 16.5% of the cost of component 990 should be apportioned to component 910. The graph traversal algorithm may attempt to find the fourth degree dependencies by finding the dependencies of component 990, however, upon finding that component 990 has no dependencies the graph traversal algorithm may cease.

Moving to FIG. 9, a representation of the dependency map determined by the graph traversal mechanism applied with respect to the data model of representation 900 and the percentages of the example depicted in FIG. 8 is illustrated. Each entry in table 1300 illustrates each of the independent cost chains originating with component 910, and the percentage of the cost of the last component in the chain that should be attributed to component 910 when calculating the cost of the asset represented by component 910, also known as the attributable cost. For example, row 1310 indicates that 16.5% of the cost of the asset represented by component 990 (a data center) should be apportioned to the asset represented by component 910 (SAP database) when calculating the cost of the asset represented by component 910. Further description and examples of one embodiment of a graph traversal algorithm may be found in U.S. Pat. No. 8,234,223, issued Jul. 31, 2012 to Miller et al, which is hereby incorporated by reference.

As can be seen then, the cost of an asset in an enterprise 50 may be determined using the data model 105 of that enterprise 50. It should be noted again that while cost is given as an example of a metric of interest that may be calculated, many other metric of interest may be calculated using the data model 105. For example, a metric of interest of impact may also be calculated as described in U.S. Pat. No. 7,664,712, hereby incorporated herein fully by reference.

Returning then, to the calculation of a metric of interest, such as cost, as mentioned above, modern enterprises are complex systems. In fact, many assets of an enterprise may be mutually dependent on one another. This may result in the data model representing an enterprise of this type having a cycle. For example, referring to FIG. 10, suppose now that the data center represented by component 990 (shown in FIG. 5) utilizes the SAP data base represented by component 910, as indicated by relationship 942. When executing the graph traversal algorithm described above to compute the cost of component 910, relationship 942 may create a cycle such that the graph traversal algorithm may enter a loop, or may apportion the cost of various components more than once. In order to avoid these cycles and the potential loops or multiple counting of costs that these cycles may entail, in one embodiment the graph traversal algorithm may maintain a record of the components which have been visited during a traversal from a component, such that if a component is reached twice this may be accounted for, for example by ignoring that particular dependency chain.

Thus, using methods and systems such as those discussed above, data model 105 may be created and traversed to calculate a metric of interest for an enterprise. Still using cost as an example of a metric of interest, FIG. 11 illustrates one embodiment of a cost model for the enterprise represented by the data model of FIG. 5. Table 1500 contains each asset, the cost of each asset and the component representing each asset. It will be understood that these costs may be determined by a variety of means, such as empirical evidence, cost projections or estimates, actual cost for hardware etc., and that these costs may be updated on a variety of time tables, and may refer to periodic costs, fixed costs etc. The costs in table 1500 may be applied to a dependency map generated from a data model to generate the cost for a particular asset.

FIG. 12 represents the results of the application of the cost model of table 1500 to the dependency map for component 910, an embodiment of which is depicted in FIG. 9. For each dependency chain 1610, the percentage of the cost of the asset represented by the last component in the dependency chain is multiplied by the cost of the asset represented by the last component. These attributable costs 1620 can then be summed to generate a total cost attributable to the asset represented by component 910. This total attributable cost can then be summed with the cost of the asset represented by component 910, to generate a cost for the asset represented by component 910. Additional description and examples of calculating a cost of an asset or impact analysis using a data model may be found in U.S. Pat. No. 8,234,223 issued Jul. 31, 2012 to Maginniss and 7,664,712 issued Feb. 16, 2010 to Duvall et al., which are hereby incorporated by reference.

As mentioned above, a common problem with calculations of metrics of interest, like cost, may be the data, or the lack thereof, in the data model being used to calculate such a metric of interest. For example, the results shown in FIG. 12 do not reflect if the data used to calculate the cost of an asset is complete, as there may be additional components not captured in data model 105, or some other error that reduces data completeness. Often, data is not centralized but instead exists in diverse data sources and locations, for example in Tivoli and SMS applications, in spreadsheets, in diagrams, in modeling tools, etc. Much of the data in these various data sources is overlapping and frequently conflicting. Because data is stored in diverse data sources and locations, it may not be easily accessible. Thus, data may not be available to those who require it or the data may become increasingly obsolete because it is difficult to access. As a result, the problems of gathering data from various sources in various formats in a data model being used to model an enterprise architecture may result in data completeness (DC) problems with respect to the resulting data model and metrics of interest calculated therefrom. Data completeness or a data completeness measure may refer to a ratio or other measure of data that could be used to calculate a metric of interest if it was present and data that actually is present in a data model In addition, because the process of extracting data to a central database can consume large amounts of computational resources, the process has the potential to prevent other processes, program or users from receiving computational resources adequate for their processing requirements, effectively limiting the use of the database or the computer system running the database.

Regardless of how data completeness (DC) problems occur, the calculations described above and others may generate an inaccurate representation of an enterprise or portions thereof. For example, a central feature of Business Intelligence systems is the ability to generate calculated values from raw data, for example sums or other arithmetic aggregation of detailed data elements. In common situations that raw data can be incomplete, which aggregating calculations often tolerate readily. These calculations will deliver a result to the end user (or subsequent calculations) without regard to the level of data completeness (DC) in the raw data. For example, in the example provided above in FIG. 12, a total cost to an attribute (i.e., $760,000) may be returned as the result of calculations performed regardless of whether the data was complete. The lack of complete data undermines the reliability of the calculated result, but the result by itself does not allow the consumer to assess its reliability. Thus, it is desirable for users to have some measure of the data completeness that is correlated to a metric of interest.

A standard approach to this problem is to implement a supplemental calculation whose sole purpose is to evaluate DC. This DC calculation is developed in tandem with the calculation of interest, and must typically traverse the same raw data model performing different arithmetic. In a SQL-based system this generally requires multiple additional queries to a database. In an electronic spreadsheet an end user might develop paired formulas: one to perform a calculation and another to assess the DC of that calculation. These formulas would also require separate access to the same data.

As can be seen then, these approaches to the problem of determining data completeness unfortunately require significant duplicative effort, which is expensive and error prone particularly for calculations whose definition evolves over time. The standard approach also suffers from a need to traverse the same raw data model twice, which doubles the computational expense.

As such, it is rare that effective measures of data completeness are utilized. Therefore, a user may request a report on a metric of interest, and a set of calculations may be executed relative to the data, and the results of the report may be incorrect or calculated based on incomplete data, but the user might not be aware of the error lack of accuracy resulting from the incomplete data. For example, reports may be run on insufficient data without the user's knowledge, or the relationships that allow the data model to be analyzed may not be established properly, or the attributes have not been populated, or there may be properties assigned to only a few components of the data model, etc. Any of these permutations or any combination may result in poor data completeness.

Further complicating the problem, in many cases a user may request a report on a metric of interest, where that report is segmented according to certain criteria. For example, a user may request a report on the cost of servers segmented according to department. Thus, a user may want a report of the cost of servers in HR, the cost of servers in IT, etc. As discussed above, because the completeness of data across an enterprise and in a data model representing that enterprise may vary widely, the completeness of data with respect to each of the segments a user desires may vary widely. Continuing with the above example the completeness of data used to calculate the cost of HR servers might be 90% while the completeness of data using to calculate the cost of servers in IT might be 25%, etc. In other words, 90% of the components representing servers in HR may have had a value for a cost property associated with them, while 10% of the components representing servers in HR may have had no value for the cost associated with the component. Accordingly, only the value of cost associated with 90% of the servers in HR was used to calculate the cost reported to the user. Similarly, 25% of the components representing servers in IT may have had a value for a cost property associated with them, while 75% of the components representing servers in HR may have had no value for the cost associated with the component. Accordingly, only the value of cost associated with 25% of the servers in IT was used to calculate the cost reported to the user. As may be realized, a user's evaluation of the reliability of the cost calculated for the servers of HR and the servers of IT may be severely affected based on the data completeness measure reported for the calculation of the metric of interest of cost in this instance.

Accordingly, businesses and other users of data models would like to have better understanding of the completeness of data used in the underlying calculations of metrics of interest that use those data models, and may specifically want data completeness measures that correspond to the metric of interest being calculated and which reflect the completeness of data segmented according to the segments of data utilized to calculate a metric of interest. Furthermore, it may be desired that the calculation of such data completeness measure be computationally and developmentally simple.

Figure 13:
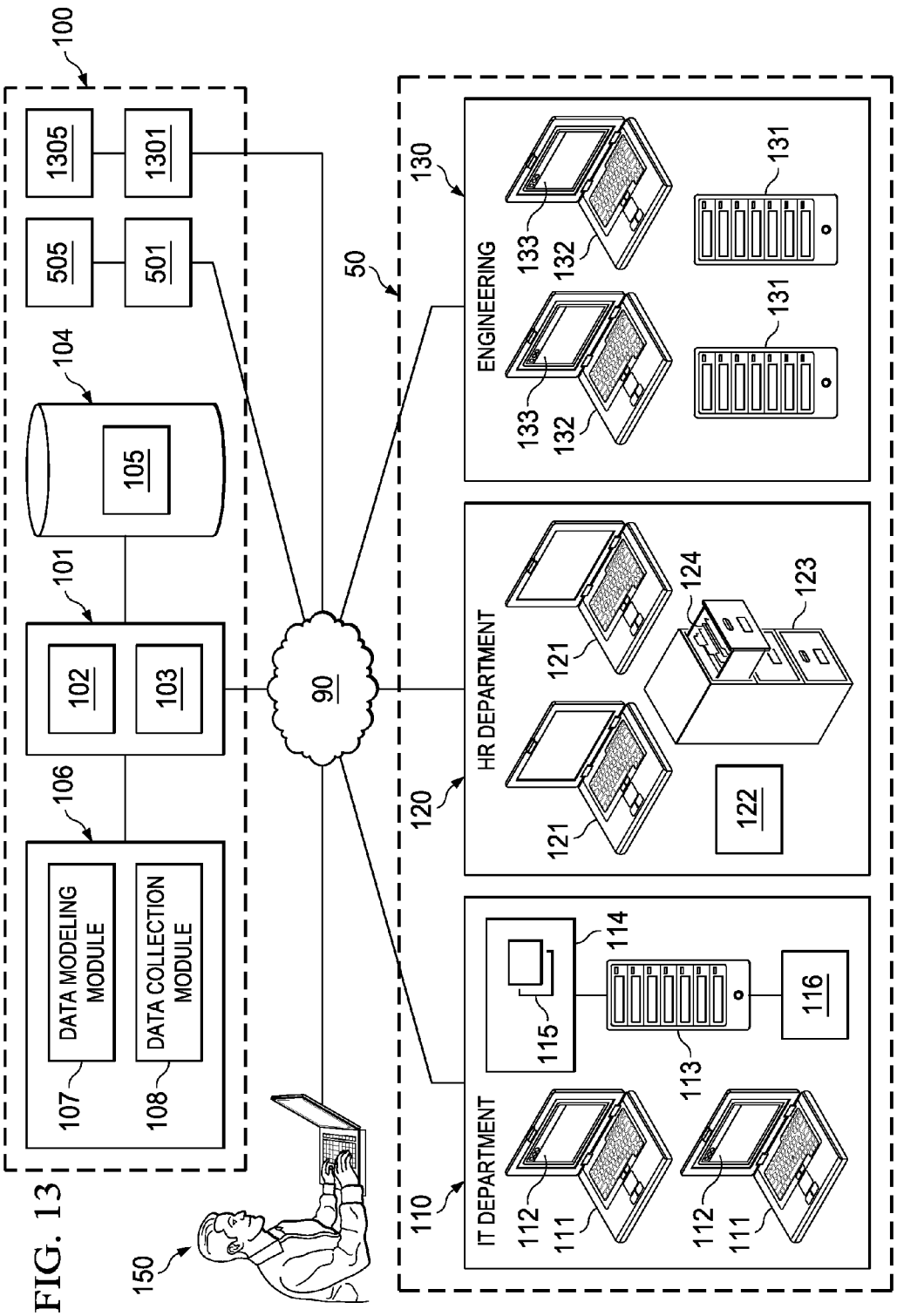
FIG. 13 depicts a diagram illustrating a one embodiment of an enterprise and system for performing data completeness analyses.

To overcome these and other shortcomings, a system and method for determining data completeness may be needed. Embodiments disclosed herein thus provide a query and calculation framework capable of providing calculation results and DC assessments from a common definition, and in a single execution. Calculations of DC can be made available with minimal development expense. DC can be assessed with minimal additional computational expense. End users can readily access DC assessments in order to understand the quality of the information on which they are making business decisions. FIG. 13 depicts a diagram illustrating the enterprise architecture 50 coupled via network 90 to system 100 including data completeness system 1301 executing a set of instructions, where data completeness system further includes data completeness module 1305. Data completeness module 1305 may communicate with one or more of repository 104, computer 101, and metric calculation module 505 to receive information useful for performing a data completeness analysis. Data completeness module 1305 may evaluate data model 105 to determine a measure of the completeness (data completeness measure) of data model 105 or portions of data model 105 corresponding to a metric of interest calculation being performed by metric calculation module 505, the completeness of any calculation based on data model 105, or both. The measure of data completeness may provide a level of confidence to a user that a calculation for a metric of interest is accurate or provide the ability to evaluate the probative value of such a metric of interest.

A user at user computer 150 may request an analysis of a metric of interest relating to an enterprise. Metric calculation module 505 is configured to access data model 105 and calculate such a metric of interest. For example, such a metric of interest may be directed to costs or to revenues. Furthermore, a metric of interest may relate to internal concerns of an enterprise, such as the cost of running business applications, manufacturing processes, etc., or to external concerns, such as how profitable certain customers are for the enterprise. Other metrics of interest may include impact of an asset on the enterprise, indirect costs, such as energy usage, indirect revenues, such as savings. Other metrics of interest may also be imagined.

For example, an enterprise may want to analyze their customer base to see how much revenue the enterprise is earning from each customer and assess the revenue earned against how much the customer costs the enterprise. As another example, an enterprise may want to perform a calculation for a metric of interest called "customer score" that takes into account information in order to allow marketing and other selling efforts to be targeted to high-value customers. Such a metric of interest might reflect how capable are they to spend more (considering household income), what is the order history, how recently have they ordered, how active are they, how profitable they have been, what is the profit margin on the products ordered, how often have orders been returned, how much expense is involved with returns to keep the customer happy, etc. For example, a customer may purchase high-margin items but require a lot of assistance, or may frequently return items, etc. Thus, for a customer, a set of calculations for a metric of interest may include determining how much revenue is earned from the customer, such as by determining the unit cost for a product, subtracting the unit cost from the sale price, and multiplying the result by the number of products purchased. Other calculations may be performed. For example, a summary calculation may be used for determining an average price for a repeat customer buying the same item at different times of the year in which seasonal changes in price may occur.

Embodiments of system 100 may receive the request for the determination of a metric of interest and provide the request to metric calculation module 505. Metric calculation module 505 may be configured to determine a component type in data model 105 with which to start its calculation of the metric of interest (e.g., all components representing customers). Using these root nodes, the data model 105 may be traversed or otherwise navigated by metric calculation module 505 to obtain the data needed to calculate the metric of interest (if such data is present) and the metric of interest calculated.

Figure 14:
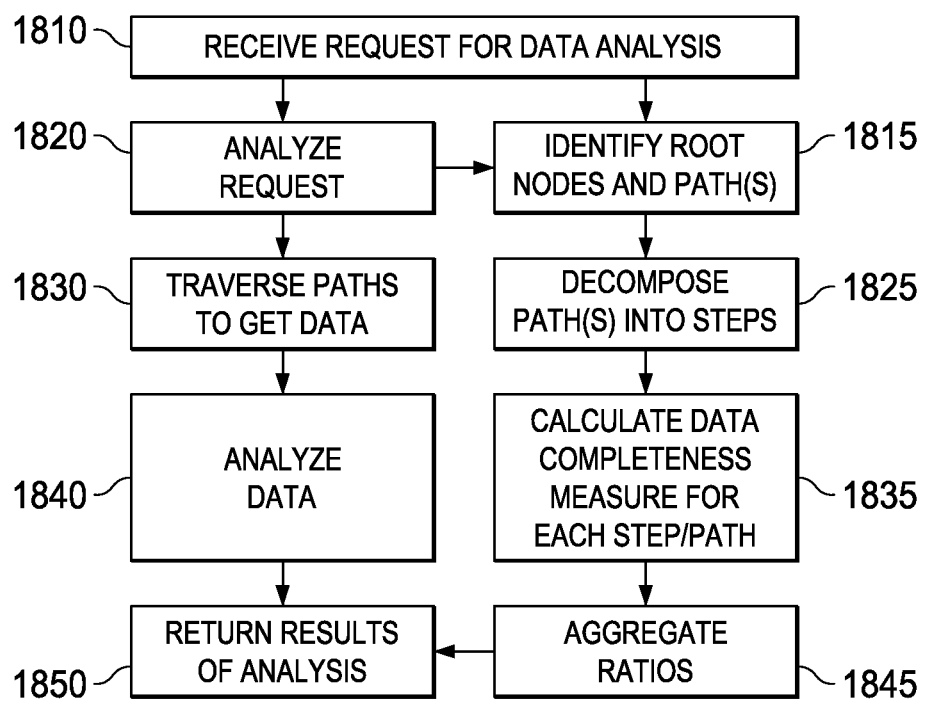
FIG. 14 depicts a flow diagram of one embodiment for determining data completeness for analytic data calculations.

Data completeness module 1305 may be configured to calculate a data completeness measure. In particular, data completeness module 1305 may be configured to calculate a data completeness measure corresponding to the metric of interest being calculated by metric calculation module 505 based on the data in data model. More particularly, in certain embodiments, as metric calculation module 505 traverses or otherwise navigates the data model 105 to obtain data for the calculation of the metric of interest, data completeness module 1305 may traverse the same path to determine if such data is actually present in the data model 105 (e.g., if a component is present, if a property or description of a component is present, etc.) and a data completeness measure calculated based on the presence or absence of such data. The additional analysis for determining data completeness may involve identifying all the unique paths through the data model that originate at the root node, decomposing each path into a set of steps, for each step determining what ratio of data points resulted in a value, determining an aggregate DC ratio for each unique path, and aggregating the ratios for all paths. FIG. 14 depicts a flow diagram depicting one embodiment for determining data completeness for data calculations that may calculate a metric of interest. Such steps may, for example, be performed by metric calculation module 505, data completeness module 1305 or both. In step 1810, a request is received by system 100, which may be part of an enterprise portfolio management (EPM) analysis system. Such a request may request the calculation of a metric of interest. The request may be in the form of a SQL request. For example, a SQL query may specify "select sum of cost from customers purchase orders" to specify that the user wants to find out the total cost associated with purchase orders. In some embodiments, a query may be formed in SQL or in a proprietary language. U.S. patent application Ser. No. 10/803,133, filed Mar. 17, 2004, by Miller et al. entitled "Method and System For Querying an Applied Data Model" is one example of a proprietary query language and is hereby incorporated by reference. In other embodiments, the request may be input by a user through an interface provided at user computer 150 such as those known in the art, including web based interfaces or command line interfaces. Such a request may specify a metric of interest and any additional criteria. For example, a request may specify that it is desired to calculate the metric of interest of customer score for customers in Texas.

In step 1820, system 100 may analyze the request to identify what data may be needed to calculate the metric of interest or a measure of data completeness associated with the metric of interest.

In step 1815, a root node and any paths based on the root node may be identified. The determination of a root node may involve identifying all possible nodes and then identifying the root node from the possible nodes, or the root node may be determined by some other criteria or process. In some embodiments, determining a root node may involve identifying a component in data model 105 that could be a root node based on the metric of interest. A root node is generally a component type (or a subset of component type) or property of data model 105 from which navigation or traversal of data model 105 may begin when calculating a metric of interest or a data completeness measure. For example, a request to calculate a customer score for customers living in Texas may utilize the subset of the "Customer" component type that have "Texas" in the property of shipping address as a root node.

Each path associated with the calculation of the metric of interest may be identified based on the root node. A path may include an ordered set of component types or properties where the first component type or property is the root node and the last component type or property of the path is a component type or property that comprises data that may be used to calculate the metric of interest, such that by navigating or traversing the data model 105 according to the path (e.g., starting at the root node, and accessing each of the component types or properties in order) the data may be obtained.

In step 1825, each path identified in step 1815 may be decomposed into steps. Each step is an ordered pair of the component types or properties of the path. For example, if a path comprises component types or properties 1→2→3→4, the steps of that path would be 1→2, 2→3 and 3→4. A process for decomposing paths into steps may involve identifying a component type or property in the path, determining the next component type or property in the ordered set comprising the path and, in some cases, determining one or more relationships. In some embodiments, determining relationships between component may involve determining specific relationship types. In other words, a component may have multiple relationships corresponding with various relationship types. For example, a customer may have been referred by another customer and might also have referred another customer. Thus, when tracking customer referrals, there may be a first path that traverses from a customer based on a "was referred by" relationship type to a first set of customers, and there may be a second path that traverses from the customer based on a "referred" relationship type. In both cases, the component-type sequence may be customer-to-customer, but the paths or steps may differ for metric calculations and data completeness assessments.

In step 1835 a data completeness ratio may be determined for each step of each path. This data completeness ratio for a step may be determined based on the two component types or properties comprising the step. Such a data completeness ratio may be a binary measure (e.g., a 1 if a later ordered component of the component type of the path is present and a 0 if it is not present); a fraction or ratio (e.g., a ratio of how many of the components of the later ordered component type of the path have a value for the desired property over how many components of the later ordered component type of the path do not have such a value); or some other ratio or measure altogether.

In step 1830, system 100 may access data model 105 containing the data and begin navigating or traversing (collectively referred to as traversing) data model 105 to obtain data (e.g., associated with calculation of the requested metric of interest, or the data completeness measure). Data model 105 may have multiple nodes (e.g. components or component types) and relationships, such that data model 105 may, in some embodiment, resemble a form of a graph. Accordingly, an efficient traversal system and method may be beneficial to ensuring all data necessary for the analysis is gathered, but without gathering unnecessary data. For example, if a user wants to analyze purchases for customers in Texas and the data model covers a global enterprise, only data for all customers in Texas should be included. U.S. Pat. No. 7,523,128 entitled "Method and System for Discovering Relationships" is one example of a method for traversing a data structure and is hereby incorporated by reference. A query may be formed in a common language such as SQL or a proprietary or custom language. For example, embodiments may be compatible with SparQL. Traversal of data model 105 to perform the analysis of data model 105 and a calculation of a data completeness measure corresponding to the metric of interest follow the same path(s).

During traversal of the data model (or at a later point) at step 1830, in step 1840, system 100 may gather and analyze data per the request. More specifically, as discussed above, each of the paths determined above may be a path that is traversed when obtaining data from the data model 105 in order to calculate the metric of interest. More specifically, as may be realized after a reading of the disclosures herein, there may be many components of a particular component type in the data model 105, where the components of the data model 105 represent instances of an entity represented by that component type in enterprise architecture 50. For example, enterprise architecture may have many customers. Each of those customers may be represented by a component of data model 105 which is an instance of the component type "Customer". In other words, the data model 105 may include one component of type "Customer" for each customer of enterprise architecture 50. Thus, when traversing data model 105 according to a path determined above in order to calculate the metric of interest, each component that is an instance of the type (or subset) of the root node of the path may be determined and for each of these components the data model 105 may be traversed according to the ordered component types or properties specified in the path.

During traversal of each step of the path it can be determined if data is present at a subsequent component type or property of the path, and based on the presence or absence or quantity of data associated with the subsequent component type or property of the path, a data completeness ratio determined for that step. As can be seen, an advantage to this method is that step 1835 may be performed in parallel with step 1840. Thus, as mentioned above, at the time data model 105 is being traversed to gather and analyze data to calculate a metric of interest, system 100 may also be determining a data completeness measure, obviating the need to access the data model 105 a second time to calculate such a data completeness measure.

In step 1845 data may be aggregated to form a data completeness measure. For example each of the data completeness ratios determined for each step of a path may be aggregated to form a data completeness measure for each path. A data completeness measure for a path may, for example, be determined by multiplying the data completeness ratios determined for each of step the path. The data completeness measures determined for each of the paths may then be aggregated to form a data completeness measure for the instance. While any suitable aggregation calculation may be utilized such as a minimum or weighted average, in one embodiment, an arithmetic mean of the data completeness measures for each path may be determined and this arithmetic mean used as the data completeness measure for that particular instance of the root node.

It will be noted, as discussed above, that there may be many components of a particular component type in the data model 105, where the components of the data model 105 represent instances of an entity represented by that component type in enterprise architecture 50. Thus, the data completeness measure determined above is a data completeness measure determined for a component that is one instance of the component type that is the root node. To continue with the above example, enterprise architecture may have many customers. Each of those customers may be represented by a component of data model 105 which is an instance of the component type "Customer". In other words, the data model 105 may include one component of type "Customer" for each customer of enterprise architecture 50. Thus, an instance data completeness measure may be determined when traversing data model 105 according to the paths determined above starting with one instance of a "Customer" component.

Accordingly, each of the instance data completeness measures determined for each instance of the root node may be aggregated (e.g., by taking a arithmetic mean, weighted average, normalization, etc.) in order determine an overall data completeness measure that is associated with a metric of interest. Note then, that not only may the overall data completeness measure associated with a metric of interest be determined by accessing the data model 105 substantially in tandem with any access needed to calculate a metric of interest, but additionally, the overall data completeness measure accurately reflects the completeness of the data used to calculate that metric of interest.

For example, if a user desires a metric of interest of "Customer Score" calculated for all customers of the enterprise architecture, the overall metric of interest determined according to embodiments disclosed herein, will be a measure of the data completeness of the data used to calculate the "Customer Score" metric that is associated with all customers of enterprise architecture. Similarly, if a user desires a metric of interest of "Customer Score" calculated for only those customers of the enterprise architecture that live in "Texas", the overall metric of interest determined according to embodiments disclosed herein, will be a measure of the data completeness of only the data used to calculate the "Customer Score" metric that is associated with customers of enterprise architecture that live in "Texas." As may be realized such a measure of data completeness may be a powerful tool for evaluating a metric of interest (or other points of interest, such as a data model, etc.), as it may accurately reflect the very data that was used to calculate that metric of interest.

At step 1850 then, one or more data completeness measures (e.g., the data completeness for an instance, the overall data completeness measure) may be returned, and presented to a user at user computer 150. This data completeness measure may, in one embodiment, be presented to a user in conjunction with the determined metric of interest such that the user has a simple method of visually (or otherwise) associating the metric of interest with the data completeness measure for that metric of interest.

To further aid in the understanding of a data completeness measure and how a data completeness measure may be calculated for a particular metric of interest, an example may be helpful.

Figure 15:
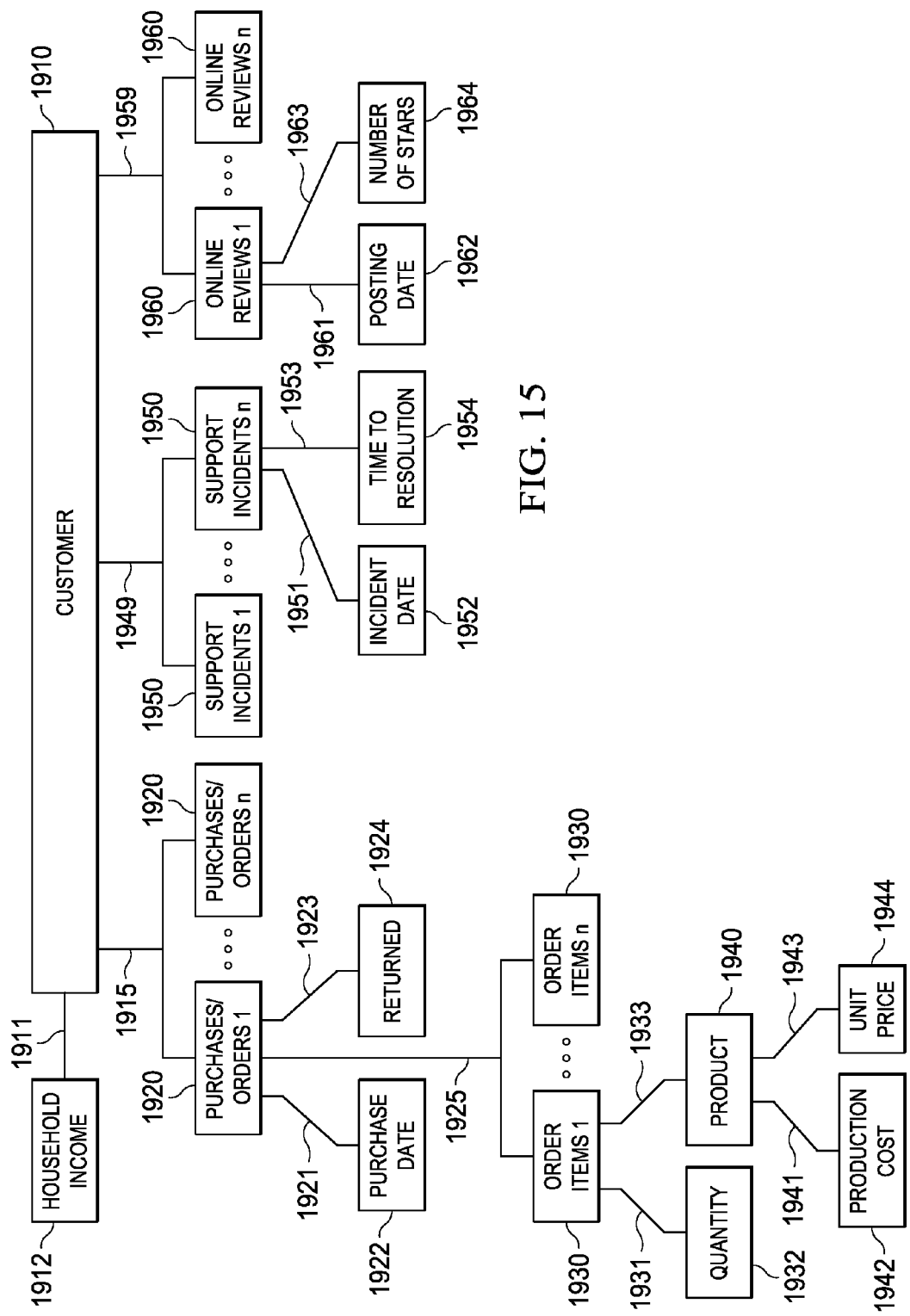
FIG. 15 depicts a graph of a portion of a data model.

FIG. 15 depicts graph 1900 of a portion of a data model, illustrating enterprise architecture being modeled using data model 105. Customer 1910, Purchases/Orders 1920, Order Items 1930, Product 1940, Support Incidents 1950, and Online reviews 1960 are objects, and Household Income 1912, Date 1922, Returned 1924, Quantity 1932, Production Cost 1942, Unit Price 1944, Incident Date 1952, Time to resolution 1954, (Online Review) Date 1962, and Number of Stars 1964 may be component types for representing physical or logical entities in enterprise 50. In this example, Customer 1910 may be a component type such that instances of Customer 1910 may be used to represent each customer of enterprise 50, Purchases/Orders 1920 may be a component type such that instances of Purchases/Orders 1920 may be used to represent each purchase or order made by a customer of enterprise 50, etc. Similarly, relationship 1911 may be a relationship type such that instances of Household Income 1912 may be associated with instances of Customer 1910. Other relationships are depicted as lines connecting components shown in FIG. 15

Using this example, if an analysis is requested based on customers of enterprise 50, Customer 1910 may be identified as a root node, and one or more paths may be determined based on the root node. FIG. 16 depicts portions of graph 1900 decomposed into paths 2010-2055 corresponding to the components and relationships illustrated in FIG. 15, with each path having an order and a group of components.

As shown in FIG. 16, path 2010 includes two component types, Customer 1910 and Household Income 1912, and a single step corresponding to relationship 1911, namely Customer→Household Income. Thus, an analysis of household incomes for customers may generally start by identifying customers (i.e., instances of component type 1910) and traversing data model 105 according to path 2010 to gather data about household income (i.e., instances of component type 1912), and may determine a data completeness measure for a household income property related to customers of enterprise 50. In this example, if there are 1000 customers but only 500 provide information about a household income, the data completeness measure may be 50% (500/1000).

Generally speaking, a more detailed enterprise may have more paths, with each path having more steps, etc., with each step having an associated data completeness measure. FIG. 16 depicts several paths for a metric of interest, ranging from a simple path having a single step (i.e., path 2010) to more complex paths having multiple steps (i.e., paths 2030 and 2035). More detailed paths are possible. Furthermore, it should be noted that component types other than component type 1910 may be selected as a root node.

Turning to a more detailed example, calculation of a metric of interest related to production cost may include identifying Customer type 1910 as a root node, then determining path 2030. Determining a data completeness measure for path 2030 may further include decomposing path 2030 into multiple steps through component types 1920 (e.g., Purchases/Orders), 1930 (e.g., Order Items), 1920 (e.g., Product 1940) and property 1942 (e.g., Production cost). FIG. 17 depicts path 2030 decomposed into four steps 2030a-2030d.

Step 2030a depicts a step from "Customer" to "Purchases/Orders", step 2030b depicts a step from "Purchases/Orders", to "Order Items", step 2030c depicts a step from "Order Items" to "Product", and step 2030d depicts a step from "Product" to "Production Cost." At each step of path 2030, data may be gathered for calculating a metric of interest. For example, data may be gathered regarding purchases/orders associated with the customers, order items included in the purchases/orders, products included as part of the order items, and production costs associated with the products. At the same time, data completeness measures may be calculated regarding how many purchases/orders were gathered in comparison with how many purchases/orders were expected (e.g., step 2030a), how many order items were included in the purchases/orders as compared to how many were expected (e.g., step 2030b), how many products were included with the order items as compared with how many were expected (e.g., step 2030c), and how much were the production costs as compared with an expected production cost (e.g., step 2030d). Thus, if there were 1000 customers but only 900 orders (e.g., a 90% data completeness measure for step 2030a), 300 order items out of 600 expected (e.g., a 50% data completeness measure for step 2030b), 200 products out of 250 expected (e.g., a 80% data completeness measure for step 2030c) and only 15 production costs out of 30 expected (e.g., a 50% data completeness measure for step 2030d), a data completeness measure corresponding to production cost (e.g., path 2030) may be (0.9×0.5×0.8×0.5)=0.18 or 18%. This process may be performed on all paths identified in data model 105 as corresponding to the metric of interest.

Still referring to how a data completeness measure may be calculated, as the data structure is being traversed and data is being gathered for the requested analysis corresponding to a metric of interest, embodiments may gather information for determining a data completeness measure corresponding to the metric of interest. The data in the data model may be consolidated from multiple sources, and any part of the data model may be incomplete, including data not being present in the original source, data being lost during consolidation, incorrect paths, etc. For example, if the request involves sales per customer over the last two years, the request may trigger system 100 to gather sales data. In this example, system 100 may be expecting sales data for all 24 months. However, the data returned to system 100 may indicate there were ten purchases but only four order items, or the request was for the last 24 months but the data is missing 6 months of purchases, etc. In these situations, system 100 may be operable to determine there should be a target number (e.g., 24 months of sales data for a 24 month request) and determine a data completeness measure based on this target number. In some embodiments, an expected target count may be set and each record may be assessed relative to the target count. In some embodiments, a data completeness measure may be assigned. For example, if average values are used in the data analysis for the metric of interest, a statistical confidence factor may be assigned. In some embodiments, data from different parts of data model 105 may be compared to determine an expected number. For example, if a receiving department record indicates 10 products were received but a shipping department record only shows 9 were shipped, a data completeness measure of 90% may be determined. Additionally, this data completeness measure may be weighted more heavily because there is additional data to confirm the accuracy.

It should be noted that as used herein, a data completeness measure may be expressed in various formats. In some embodiments, a data completeness measure may be expressed as a percentage or fraction between 0 and 1. In some embodiments, a data completeness measure may be predetermined to be either 0 or 1 (binary). For example, a customer who purchases 1 item and a customer who purchased 1000 items are still customers, so a data completeness ratio related to customers might have either a 0 (for not being a customer) or a 1 (for being a customer). Also, it should be noted that there is a distinction between "unknown" and "zero". In the former case, the information about purchase history might not have been collected from a system of record. This would result in a completeness of 0% at that step for all affected records. In the latter case the data might have been collected and is therefore at 100% for this step even if there are 0 records. Other data completeness measures are possible.

The results of a data completeness analysis may be presented to user 150, with the results corresponding to each step, path, node, etc., or as an overall score. FIGS. 18A-E depict a simple data model, a query directed to the data model, a set of step results for the data analysis, and a sample output for a data completeness associated with the data analysis.

Figure 18A:
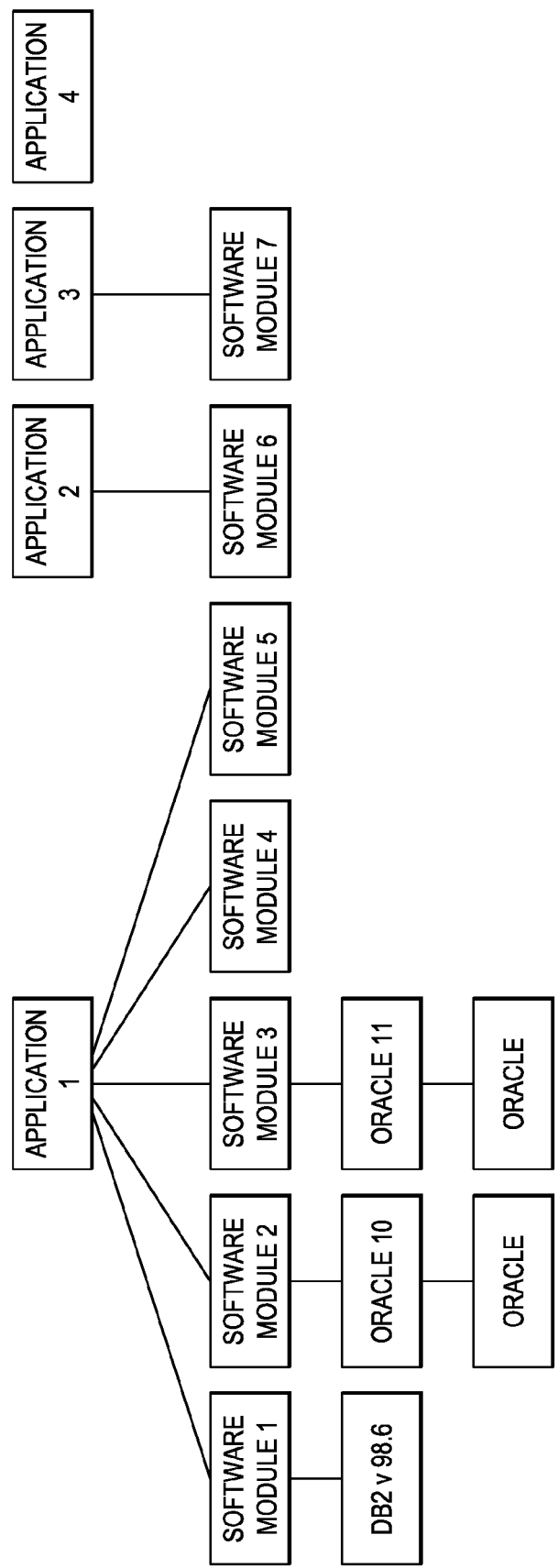

In FIG. 18A, there are four major applications (i.e., App1, App2, App3 and App4). An example of a major application may be a SAP database, and others are possible. Each major application may consist of software modules. For example, Application 1 may consist of Software Modules 1-5, Application 2 may run Software Module 6, and Application 3 may run Software Module 7. Each software module may run on a product version. For example, Software Module 2 may run on Oracle 10 for one purpose and Software Module 3 may run on Oracle 11 for a different purpose. Each software version is a version of a product. For example, Oracle 10 and Oracle 11 are both versions of Oracle. In the data model depicted in FIG. 18A, data for Software Modules 2 and 3 of Application 1 is complete. However, Application 1 also may include Software Module 1. Software Module 1 runs on "DB2 v 98.6" but there is no data indicating which product "DB2 v 98.6" is a version of, so there is a data completeness issue. Similarly, Application 1 may include Software Modules 4 and 5, but nothing is known about what software these are running on, or what version they are, or what platform they are running, etc. Furthermore, as can be seen from FIG. 18A, Applications 2 and 3 only indicate there each is running a software module (Software Module 6 and Software Module 7, respectively), but again do not provide information about the name of the platform, what version of the software is being used, etc. Application 4 has no information.

FIG. 18B depicts an example query for a metric of interest (i.e., identify all applications on a machine and further identify how many unique products each one runs on). Using a query such as depicted in FIG. 18*b*, a set of results corresponding to the metric of interest may indicate that there are four applications running (i.e., App 1, App 2, App 3 and App 4). However, in this example, App 1 corresponds to only one product (i.e., Oracle), and App 2, App 3 and App 4 do not have enough information to answer the query.

FIG. 18C depicts an example output for a data completeness measure corresponding to a query such as shown in FIG. 18*b*, in which column A lists all applications returned to the query, Column B lists all known product versions with a known product, and Column C provides a data completeness measure corresponding to the results shown in Column B. In this example, only App 1 has product versions with a known product (i.e., Oracle 10 running on Oracle, and Oracle 11 running on Oracle).

FIGS. 18D and 18E depict an example output for a data completeness measure corresponding to a query such as shown in FIG. 18*b*, with the various calculations included. For example, Table 1810 shows portions of the calculations associated with App 1, and the outcome (i.e., fraction=0.4) is the same as the data completeness measure shown in FIG. 18*c*. Tables 1820, 1830 and 1840 similarly show portions of the calculations associated with App 2, App 3 and App 4, respectively. In these three tables, the outcome (i.e., fraction=NaN) indicates there was not enough data to perform the calculation.

Thus, the results from Tables 1810, 1820, 1830 and 1840 may be used to identify two products (Oracle 10 and Oracle 11) running on Oracle, and determine that the data completeness measure for App 1 is 40%, and may further indicate that there is not enough information regarding App 2, App 3, or App 4 to accurately identify distinct products each one runs on.

FIG. 18F depicts another example output for a data completeness measure corresponding to a query such as shown in FIG. 18*b*, illustrating how various calculations and elapsed times needed to perform portions of the data completeness calculations may be presented. As mentioned above, a data completeness measure may be calculated at the same time a query is being performed for a metric of interest (i.e., the data completeness measure is being performed in real-time along with the calculation for the metric of interest). As such, elapsed times for both the metric of interest and the corresponding data completeness measure may be returned simultaneously as another parameter.

Those skilled in the art will appreciate that portions of system 100 may function as stand-alone elements or may be combined with other portions of system 100. Furthermore, although the examples provided above illustrate performing a data completeness analysis in conjunction with some other analysis, embodiments may be operable to provide a data completeness score independently, which may be useful for ensuring data completeness prior to any analysis of the enterprise architecture. In some embodiments, a threshold may be defined such that if an analysis does not produce a predetermined minimum score, additional information may be retrieved from additional sources, a user may be alerted, or the like until the minimum DC score is achieved.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for determining data completeness, comprising:
   a processor;
   a metric calculation module configured to access a data model and calculate a metric relating to costs or revenues of an enterprise based on data in the data model;
   a data completeness module configured to evaluate the data model to determine a data completeness measure of the data model corresponding to the calculation of the metric relating to the costs or revenues of the enterprise, by:
   identifying at least one root node and at least one leaf node in the data model,
   identifying a set of paths to each leaf node based on the root node,
   decomposing each path in the set of paths into one or more steps,
   determining a data completeness measure for each step in the one or more steps,
   calculating a data completeness measure for each path in the set of paths based on the data completeness measure for each step in the one or more steps,
   aggregating the data completeness measure for each path in the set of paths for the root node to determine the data completeness measure of the data model, wherein the data completeness measure of the data model corresponds to the completeness of the data used to calculate the metric relating to costs or revenues of the enterprise, and
   wherein the calculation of the metric relating to the costs or revenues of the enterprise is performed in parallel to determining the data completeness measure; and
   a memory, comprising instructions for:
   presenting the data completeness measure of the data model to a user in conjunction with the metric relating to the costs or revenues of the enterprise.

2. The system of claim 1, wherein the data completeness measure of the data model is determined by accessing the data model at the same time that the data in the data model is being accessed for calculating the metric relating to the costs or revenues of the enterprise.

3. The system of claim 1, further comprising:
   receiving data from a plurality of sources in a network; and
   populating the received data into the data model.

4. A system for determining data completeness, comprising:
   a processor;
   a metric calculation module configured to access a data model and calculate a metric relating to costs or revenues of an enterprise based on data in the data model;
   a data completeness module configured to evaluate the data model to determine a data completeness measure of the data model corresponding to the calculation of the metric relating to the costs or revenues of the enterprise by calculating a data completeness measure for each path in a set of paths based on a data completeness measure of one or more steps of each path in the set of paths by multiplying two or more data completeness measures of two or more steps of the each path in the set of paths, wherein the calculation of the metric relating to the costs or revenues of the enterprise is performed in parallel to determining the data completeness measure of the data model and the data completeness measure of the data model reflects the completeness of the data used to calculate the metric relating to the costs or revenues of the enterprise; and a memory, comprising instructions for:

presenting the data completeness measure of the data model to a user in conjunction with the metric relating to the costs or revenues of the enterprise.

5. The system of claim 4, wherein the data completeness measure of the data model associated is determined by accessing the data model at the same time that the data in the data model is being accessed for calculating the metric relating to the costs or revenues of the enterprise.

6. The system of claim 4, wherein the metric of interest includes one of an impact of an asset on an enterprise or energy use of an asset.

7. A system for determining data completeness, comprising:

a processor;

a metric calculation module configured to access a data model and calculate a metric relating to costs or revenues of an enterprise based on data in the data model;

a data completeness module configured to evaluate the data model to determine a data completeness measure of the data model corresponding to the calculation of the metric relating to the costs or revenues of the enterprise by calculating a data completeness measure for each path in a set of paths based on a data completeness measure of one or more steps of the each path in the set of paths by multiplying the data completeness measure for one of the one or more steps of the each path in the set of paths by a factor, wherein the calculation of the metric relating to the costs or revenues of the enterprise is performed in parallel to determining the data completeness measure of the data model and wherein the data completeness measure of the data model reflects the completeness of the data used to calculate the metric relating to the costs or revenues of the enterprise; and a memory, comprising instructions for:

presenting the data completeness measure of the data model to a user in conjunction with the metric relating to the costs or revenues of the enterprise.

8. The system of claim 7, wherein the data completeness measure of the data model associated is determined by accessing the data model at the same time that the data in the data model is being accessed for calculating the metric relating to the costs or revenues of the enterprise.

9. A computer program product stored on a tangible, non-transitory medium in a computer system, the computer program product comprising a set of instructions executable to perform:

accessing a data model;

calculating a metric relating to costs or revenues of an enterprise based on data in the data model;

evaluating the data model to determine a data completeness measure of the data model corresponding to the calculation of the metric relating to the costs or revenues of the enterprise by calculating a data completeness measure for each path in a set of paths based on a data completeness measure of one or more steps of the each path in the set of paths by multiplying two or more data completeness measures of two or more steps of at least one path in the set of paths, wherein the calculation of the metric relating to the costs or revenues of the enterprise is performed in parallel to determining the data completeness measure of the data model and wherein the data completeness measure of the data model reflects the completeness of the data used to calculate the metric relating to the costs or revenues of the enterprise; and presenting the data completeness measure of the data model to a user in conjunction with the metric relating to the costs or revenues of the enterprise.

10. The computer program product of claim 9, wherein the data completeness measure of the data model is determined by accessing the data model at the same time that the data in the data model is being accessed for calculating the metric relating to the costs or revenues of the enterprise.

11. The computer program product of claim 9, the set of computer instructions further executable to perform:

receiving data from a plurality of sources in a network; and populating the received data into the data model.

12. A computer program product stored on a tangible, non-transitory medium in a computer system, the computer program product comprising a set of instructions executable to perform:

accessing a data model;

calculating a metric relating to costs or revenues of an enterprise based on data in the data model;

evaluating the data model to determine a data completeness measure of the data model corresponding to the calculation of the metric relating to the costs or revenues of the enterprise by calculating a data completeness measure for each path in a set of paths based on a data completeness measure of one or more steps of each path in the set of paths including multiplying the data completeness measure for one of the one or more steps of the at least one path in the set of paths by a factor; and presenting the data completeness measure of the data model to a user in conjunction with the metric relating to the costs or revenues of the enterprise.

13. The computer program product of claim 12, wherein the data completeness measure of the data model associated is determined by accessing the data model at the same time that the data in the data model is being accessed for calculating the metric relating to the costs or revenues of the enterprise.

14. The computer program product of claim 12, wherein the metric of interest includes one of an impact of an asset on an enterprise or energy use of an asset.

15. A method of determining data completeness for a data model, comprising:

at a data completeness system for use in data modeling, the data completeness system embodied on a non-transitory computer memory including instructions translatable by at least one processor for determining data completeness for analytic data calculations, the method comprises:

accessing a data model;

calculating a metric relating to costs or revenues of an enterprise based on data in the data model;

evaluating the data model to determine a data completeness measure of the data model corresponding to calculation of the metric relating to the costs or revenues of the enterprise by identifying at least one root node and at least one leaf node in the data model, identifying a set of paths to each leaf node based on the root node, analyzing data in the data model, decomposing each path in the set of paths into one or more steps, determining a data completeness measure for each step in the one or more steps, calculating a data completeness measure for each path in the set of paths based on a data completeness measure for each step in the one or more steps;

aggregating the data completeness measure for each path in the set of paths for the root node, wherein the aggregated data completeness measure for the root node is the data completeness measure of the data model and the calculation of the metric relating to the costs or revenues of the enterprise is performed in parallel to determining the data completeness measure of the data model and wherein the data completeness measure of the data model reflects the completeness of the data used to calculate the metric relating to the costs or revenues of the enterprise; and presenting the data completeness measure of the data model to a user in conjunction with the metric relating to the costs or revenues of the enterprise.

16. The method of claim 15, further comprising the steps of:

receiving data from a plurality of sources in a network; and populating the received data into the data model.

17. A method of determining data completeness for a data model, comprising:

at a data completeness system for use in data modeling, the data completeness system embodied on a non-transitory computer memory including instructions translatable by at least one processor for determining data completeness for analytic data calculations, the method comprises:

accessing a data model;

calculating a metric relating to costs or revenues of an enterprise based on data in the data model;

evaluating the data model to determine a data completeness measure of the data model corresponding to calculation of the metric relating to the costs or revenues of the enterprise by calculating a data completeness measure for each path in a set of paths based on a data completeness measure of one or more steps of the each path in the set of paths including multiplying two or more data completeness measures of two or more steps of at least one path in the set of paths, wherein the calculation of the metric relating to the costs or revenues of the enterprise is performed in parallel to determining the data completeness measure of the data model and wherein the data completeness measure of the data model reflects the completeness of the data used to calculate the metric relating to the costs or revenues of the enterprise; and presenting the data completeness measure of the data model to a user in conjunction with the metric relating to the costs or revenues of the enterprise.

18. The method of claim 17, wherein the data completeness measure of the data model associated is determined by accessing the data model at the same time that the data in the data model is being accessed for calculating the metric relating to the costs or revenues of the enterprise.

19. The method of claim 17, wherein the metric of interest includes one of an impact of an asset on an enterprise or energy use of an asset.

20. A computer program product stored on a tangible, non-transitory medium in a computer system, the computer program product comprising a set of instructions executable to perform:

accessing a data model;

calculating a metric relating to costs or revenues of an enterprise based on data in the data model;

evaluating the data model to determine a data completeness measure of the data model corresponding to the calculation of the metric relating to the costs or revenues of the enterprise by identifying at least one root node and at least one leaf node in the data model;

identifying a set of paths to each leaf node based on the root node;

decomposing each path in the set of paths into one or more steps;

for each step in the one or more steps, determining a data completeness measure;

calculating a data completeness measure for each path in the set of paths based on the data completeness measure for each step in the one or more steps; and aggregating the data completeness measure for each path in the set of paths for the root node to determine the data completeness measure corresponding to the calculation of the metric relating to costs or revenues of the enterprise, wherein the calculation of the metric relating to the costs or revenues of the enterprise is performed in parallel to determining the data completeness measure of the data model and wherein the data completeness measure of the data model reflects the completeness of the data used to calculate the metric relating to the costs or revenues of the enterprise; and presenting the data completeness measure of the data model to a user in conjunction with the metric relating to the costs or revenues of the enterprise.

* * * * *